(12) United States Patent
Petrovic et al.

(10) Patent No.: US 8,726,304 B2
(45) Date of Patent: May 13, 2014

(54) TIME VARYING EVALUATION OF MULTIMEDIA CONTENT

(75) Inventors: Rade Petrovic, San Diego, CA (US); Patrick George Downes, San Diego, CA (US)

(73) Assignee: Verance Corporation, San Diego, CA (US)

( * ) Notice: Subject to any disclaimer, the term of this patent is extended or adjusted under 35 U.S.C. 154(b) by 43 days.

(21) Appl. No.: 13/615,320

(22) Filed: Sep. 13, 2012

(65) Prior Publication Data

US 2014/0075465 A1    Mar. 13, 2014

(51) Int. Cl.
*H04N 7/16* (2011.01)
*H04H 60/33* (2008.01)
*H04H 60/32* (2008.01)

(52) U.S. Cl.
USPC .............................................. 725/13; 725/16

(58) Field of Classification Search
None
See application file for complete search history.

(56) References Cited

U.S. PATENT DOCUMENTS

| | | | |
|---|---|---|---|
| 3,406,344 A | 10/1968 | Hopper | |
| 3,842,196 A | 10/1974 | Loughlin | |
| 3,885,217 A | 5/1975 | Cintron | |
| 3,894,190 A | 7/1975 | Gassmann | |
| 3,919,479 A | 11/1975 | Moon et al. | |
| 3,973,206 A | 8/1976 | Haselwood et al. | |
| 4,048,562 A | 9/1977 | Haselwood et al. | |
| 4,176,379 A | 11/1979 | Wessler et al. | |
| 4,199,788 A | 4/1980 | Tsujimura | |
| 4,225,967 A | 9/1980 | Miwa et al. | |
| 4,230,990 A | 10/1980 | Lert, Jr. et al. | |
| 4,281,217 A | 7/1981 | Dolby | |
| 4,295,128 A | 10/1981 | Hashemian et al. | |
| 4,425,578 A | 1/1984 | Haselwood et al. | |
| 4,454,610 A | 6/1984 | Sziklai | |
| 4,464,656 A | 8/1984 | Nakamura | |
| 4,497,060 A | 1/1985 | Yang | |
| 4,512,013 A | 4/1985 | Nash et al. | |
| 4,547,804 A | 10/1985 | Greenberg | |
| 4,564,862 A | 1/1986 | Cohen | |

(Continued)

FOREIGN PATENT DOCUMENTS

| | | |
|---|---|---|
| CA | 2276638 A1 | 1/2000 |
| EP | 282734 A1 | 9/1988 |

(Continued)

OTHER PUBLICATIONS

Kirovski, D., et al., "Multimedia content screening using a dual watermarking and fingerprinting system,"Multimedia '02 Proceedings of the tenth ACM international conference on Multimedia, 2002 (11 pages).

(Continued)

*Primary Examiner* — Oschta Montoya
(74) *Attorney, Agent, or Firm* — Perkins Coie LLP; Donald L. Wenskay

(57) ABSTRACT

Methods, systems, devices and computer program products are provided to facilitate enhanced use and interaction with multimedia content that is based on a time-varying evaluation of the multimedia content. While a content is being presented on a first device, timing information identifying temporal locations of content segments are extracted and transmitted to a database along with a user's evaluation feedback of the multimedia content. The user then receives a response corresponding to feedback provided by a plurality of consumers of the multimedia content on a segment-by-segment basis.

34 Claims, 5 Drawing Sheets

(56) References Cited

U.S. PATENT DOCUMENTS

| | | |
|---|---|---|
| 4,593,904 A | 6/1986 | Graves |
| 4,639,779 A | 1/1987 | Greenberg |
| 4,669,089 A | 5/1987 | Gahagan et al. |
| 4,677,466 A | 6/1987 | Lert, Jr. et al. |
| 4,686,707 A | 8/1987 | Iwasaki et al. |
| 4,703,476 A | 10/1987 | Howard |
| 4,706,282 A | 11/1987 | Knowd |
| 4,723,302 A | 2/1988 | Fulmer et al. |
| 4,729,398 A | 3/1988 | Benson et al. |
| 4,739,398 A | 4/1988 | Thomas et al. |
| 4,750,173 A | 6/1988 | Bluthgen |
| 4,755,871 A | 7/1988 | Morales-Garza et al. |
| 4,755,884 A | 7/1988 | Efron et al. |
| 4,764,608 A | 8/1988 | Masuzawa et al. |
| 4,764,808 A | 8/1988 | Solar |
| 4,789,863 A | 12/1988 | Bush |
| 4,805,020 A | 2/1989 | Greenberg |
| 4,807,013 A | 2/1989 | Manocha |
| 4,807,031 A | 2/1989 | Broughton et al. |
| 4,840,602 A | 6/1989 | Rose |
| 4,843,562 A | 6/1989 | Kenyon et al. |
| 4,876,617 A | 10/1989 | Best et al. |
| 4,876,736 A | 10/1989 | Kiewit |
| 4,930,011 A | 5/1990 | Kiewit |
| 4,931,871 A | 6/1990 | Kramer |
| 4,937,807 A | 6/1990 | Weitz et al. |
| 4,939,515 A | 7/1990 | Adelson |
| 4,943,963 A | 7/1990 | Waechter et al. |
| 4,945,412 A | 7/1990 | Kramer |
| 4,967,273 A | 10/1990 | Greenberg |
| 4,969,041 A | 11/1990 | O'Grady et al. |
| 4,972,471 A | 11/1990 | Gross et al. |
| 4,972,503 A | 11/1990 | Zurlinden |
| 4,979,210 A | 12/1990 | Nagata et al. |
| 5,057,915 A | 10/1991 | Von Kohorn |
| 5,073,925 A | 12/1991 | Nagata et al. |
| 5,080,479 A | 1/1992 | Rosenberg |
| 5,113,437 A | 5/1992 | Best et al. |
| 5,116,437 A | 5/1992 | Yamamoto et al. |
| 5,161,251 A | 11/1992 | Mankovitz |
| 5,191,615 A | 3/1993 | Aldava et al. |
| 5,200,822 A | 4/1993 | Bronfin et al. |
| 5,210,820 A | 5/1993 | Kenyon |
| 5,210,831 A | 5/1993 | Emma et al. |
| 5,213,337 A | 5/1993 | Sherman |
| 5,214,792 A | 5/1993 | Alwadish |
| 5,237,611 A | 8/1993 | Rasmussen et al. |
| 5,251,041 A | 10/1993 | Young et al. |
| 5,270,480 A | 12/1993 | Hikawa |
| 5,294,962 A | 3/1994 | Sato et al. |
| 5,294,982 A | 3/1994 | Salomon et al. |
| 5,319,453 A | 6/1994 | Copriviza et al. |
| 5,319,735 A | 6/1994 | Preuss et al. |
| 5,351,304 A | 9/1994 | Yamamoto |
| 5,379,345 A | 1/1995 | Greenberg |
| 5,402,488 A | 3/1995 | Karlock |
| 5,404,160 A | 4/1995 | Schober et al. |
| 5,404,377 A | 4/1995 | Moses |
| 5,408,258 A | 4/1995 | Kolessar |
| 5,414,729 A | 5/1995 | Fenton |
| 5,424,785 A | 6/1995 | Orphan |
| 5,425,100 A | 6/1995 | Thomas et al. |
| 5,432,799 A | 7/1995 | Shimpuku et al. |
| 5,436,653 A | 7/1995 | Ellis et al. |
| 5,450,490 A | 9/1995 | Jensen et al. |
| 5,452,901 A | 9/1995 | Nakada et al. |
| 5,473,631 A | 12/1995 | Moses |
| 5,481,294 A | 1/1996 | Thomas et al. |
| 5,497,372 A | 3/1996 | Nankoh et al. |
| 5,502,576 A | 3/1996 | Ramsay et al. |
| 5,504,518 A | 4/1996 | Ellis et al. |
| 5,508,754 A | 4/1996 | Orphan |
| 5,519,454 A | 5/1996 | Willis |
| 5,526,427 A | 6/1996 | Thomas et al. |
| 5,537,484 A | 7/1996 | Kobayashi |
| 5,579,124 A | 11/1996 | Aijala et al. |
| 5,581,658 A | 12/1996 | O'Hagan et al. |
| 5,581,800 A | 12/1996 | Fardeau et al. |
| 5,592,553 A | 1/1997 | Guski et al. |
| 5,612,729 A | 3/1997 | Ellis et al. |
| 5,613,004 A | 3/1997 | Cooperman et al. |
| 5,636,292 A | 6/1997 | Rhoads |
| 5,664,018 A | 9/1997 | Leighton |
| 5,687,191 A | 11/1997 | Lee et al. |
| 5,687,236 A | 11/1997 | Moskowitz et al. |
| 5,699,427 A | 12/1997 | Chow et al. |
| 5,719,619 A | 2/1998 | Hattori et al. |
| 5,719,937 A | 2/1998 | Warren et al. |
| 5,737,329 A | 4/1998 | Horiguchi |
| 5,752,880 A | 5/1998 | Gabai et al. |
| 5,761,606 A | 6/1998 | Wolzien |
| 5,764,763 A | 6/1998 | Jensen et al. |
| 5,778,108 A | 7/1998 | Coleman, Jr. |
| 5,787,334 A | 7/1998 | Fardeau et al. |
| 5,805,635 A | 9/1998 | Andrews, Jr. et al. |
| 5,809,064 A | 9/1998 | Fenton et al. |
| 5,819,289 A | 10/1998 | Sanford, II et al. |
| 5,822,360 A | 10/1998 | Lee et al. |
| 5,822,432 A | 10/1998 | Moskowitz et al. |
| 5,825,892 A | 10/1998 | Braudaway et al. |
| 5,828,325 A | 10/1998 | Wolosewicz et al. |
| 5,832,119 A | 11/1998 | Rhoads |
| 5,841,978 A | 11/1998 | Rhoads |
| 5,848,155 A | 12/1998 | Cox |
| 5,850,249 A | 12/1998 | Massetti et al. |
| 5,850,481 A | 12/1998 | Rhoads |
| 5,862,260 A | 1/1999 | Rhoads |
| 5,887,243 A | 3/1999 | Harvey et al. |
| 5,889,868 A | 3/1999 | Moskowitz et al. |
| 5,892,900 A | 4/1999 | Ginter et al. |
| 5,893,067 A | 4/1999 | Bender et al. |
| 5,901,178 A | 5/1999 | Lee et al. |
| 5,905,800 A | 5/1999 | Moskowitz et al. |
| 5,930,369 A | 7/1999 | Cox et al. |
| 5,933,798 A | 8/1999 | Linnartz |
| 5,937,000 A | 8/1999 | Lee et al. |
| 5,940,124 A | 8/1999 | Janko et al. |
| 5,940,134 A | 8/1999 | Wirtz |
| 5,940,135 A | 8/1999 | Petrovic et al. |
| 5,940,429 A | 8/1999 | Lam et al. |
| 5,943,422 A | 8/1999 | Van Wie et al. |
| 5,945,932 A | 8/1999 | Smith et al. |
| 5,949,885 A | 9/1999 | Leighton |
| 5,960,081 A | 9/1999 | Vynne et al. |
| 5,963,909 A | 10/1999 | Warren et al. |
| 5,986,692 A | 11/1999 | Logan et al. |
| 6,021,432 A | 2/2000 | Sizer, II et al. |
| 6,031,914 A | 2/2000 | Tewfik et al. |
| 6,035,171 A | 3/2000 | Takaya et al. |
| 6,035,177 A | 3/2000 | Moses et al. |
| 6,044,156 A | 3/2000 | Honsinger et al. |
| 6,061,793 A | 5/2000 | Tewfik et al. |
| 6,067,440 A | 5/2000 | Diefes |
| 6,078,664 A | 6/2000 | Moskowitz et al. |
| 6,094,228 A | 7/2000 | Ciardullo et al. |
| 6,101,310 A | 8/2000 | Terada et al. |
| 6,128,597 A | 10/2000 | Kolluru et al. |
| 6,145,081 A | 11/2000 | Winograd et al. |
| 6,154,571 A | 11/2000 | Cox et al. |
| 6,160,986 A | 12/2000 | Gabai et al. |
| 6,173,271 B1 | 1/2001 | Goodman et al. |
| 6,175,627 B1 | 1/2001 | Petrovic et al. |
| 6,189,123 B1 | 2/2001 | Anders Nystrom et al. |
| 6,209,092 B1 | 3/2001 | Linnartz |
| 6,209,094 B1 | 3/2001 | Levine et al. |
| 6,222,932 B1 | 4/2001 | Rao et al. |
| 6,229,572 B1 | 5/2001 | Ciardullo et al. |
| 6,233,347 B1 | 5/2001 | Chen et al. |
| 6,246,775 B1 | 6/2001 | Nakamura et al. |
| 6,246,802 B1 | 6/2001 | Fujihara et al. |
| 6,249,870 B1 | 6/2001 | Kobayashi et al. |
| 6,252,972 B1 | 6/2001 | Linnartz |
| 6,253,113 B1 | 6/2001 | Lu |
| 6,253,189 B1 | 6/2001 | Feezell et al. |

(56) References Cited

U.S. PATENT DOCUMENTS

| | | |
|---|---|---|
| 6,268,866 B1 | 7/2001 | Shibata |
| 6,278,792 B1 | 8/2001 | Cox et al. |
| 6,282,299 B1 | 8/2001 | Tewfik et al. |
| 6,285,774 B1 | 9/2001 | Schumann et al. |
| 6,289,108 B1 | 9/2001 | Rhoads |
| 6,290,566 B1 | 9/2001 | Gabai et al. |
| 6,330,335 B1 | 12/2001 | Rhoads |
| 6,330,672 B1 | 12/2001 | Shur |
| 6,332,031 B1 | 12/2001 | Rhoads et al. |
| 6,332,194 B1 | 12/2001 | Bloom et al. |
| 6,353,672 B1 | 3/2002 | Rhoads |
| 6,363,159 B1 | 3/2002 | Rhoads |
| 6,373,974 B2 | 4/2002 | Zeng |
| 6,374,036 B1 | 4/2002 | Ryan et al. |
| 6,381,341 B1 | 4/2002 | Rhoads |
| 6,385,330 B1 | 5/2002 | Powell et al. |
| 6,388,712 B1 | 5/2002 | Shinohara et al. |
| 6,389,152 B2 | 5/2002 | Nakamura et al. |
| 6,389,538 B1 | 5/2002 | Gruse et al. |
| 6,400,826 B1 | 6/2002 | Chen et al. |
| 6,400,827 B1 | 6/2002 | Rhoads |
| 6,404,781 B1 | 6/2002 | Kawamae et al. |
| 6,404,898 B1 | 6/2002 | Rhoads |
| 6,411,725 B1 | 6/2002 | Rhoads |
| 6,415,040 B1 | 7/2002 | Linnartz et al. |
| 6,415,041 B1 | 7/2002 | Oami et al. |
| 6,424,726 B2 | 7/2002 | Nakano et al. |
| 6,427,012 B1 | 7/2002 | Petrovic |
| 6,430,301 B1 | 8/2002 | Petrovic |
| 6,430,302 B2 | 8/2002 | Rhoads |
| 6,449,367 B2 | 9/2002 | Van Wie et al. |
| 6,449,496 B1 | 9/2002 | Beith et al. |
| 6,473,560 B1 | 10/2002 | Linnartz et al. |
| 6,477,431 B1 | 11/2002 | Kalker et al. |
| 6,487,301 B1 | 11/2002 | Zhao |
| 6,490,355 B1 | 12/2002 | Epstein |
| 6,496,591 B1 | 12/2002 | Rhoads |
| 6,505,160 B1 | 1/2003 | Levy et al. |
| 6,510,233 B1 | 1/2003 | Nakano |
| 6,510,234 B1 | 1/2003 | Cox et al. |
| 6,512,837 B1 | 1/2003 | Ahmed |
| 6,523,113 B1 | 2/2003 | Wehrenberg |
| 6,529,506 B1 | 3/2003 | Yamamoto et al. |
| 6,530,021 B1 | 3/2003 | Epstein et al. |
| 6,550,011 B1 | 4/2003 | Sims, III |
| 6,553,127 B1 | 4/2003 | Kurowski |
| 6,556,688 B1 | 4/2003 | Ratnakar |
| 6,557,103 B1 | 4/2003 | Boncelet, Jr. et al. |
| 6,570,996 B1 | 5/2003 | Linnartz |
| 6,571,144 B1 | 5/2003 | Moses et al. |
| 6,574,350 B1 | 6/2003 | Rhoads et al. |
| 6,577,744 B1 | 6/2003 | Braudaway et al. |
| 6,584,138 B1 | 6/2003 | Neubauer et al. |
| 6,590,996 B1 | 7/2003 | Reed et al. |
| 6,590,997 B2 | 7/2003 | Rhoads |
| 6,591,365 B1 | 7/2003 | Cookson |
| 6,592,516 B2 | 7/2003 | Lee |
| 6,598,162 B1 | 7/2003 | Moskowitz |
| 6,614,914 B1 | 9/2003 | Rhoads et al. |
| 6,618,484 B1 | 9/2003 | Van Wie et al. |
| 6,625,297 B1 | 9/2003 | Bradley |
| 6,633,653 B1 | 10/2003 | Hobson et al. |
| 6,636,615 B1 | 10/2003 | Rhoads et al. |
| 6,647,128 B1 | 11/2003 | Rhoads |
| 6,647,129 B2 | 11/2003 | Rhoads |
| 6,654,501 B1 | 11/2003 | Acharya et al. |
| 6,661,905 B1 | 12/2003 | Chupp et al. |
| 6,665,419 B1 | 12/2003 | Oami |
| 6,668,068 B2 | 12/2003 | Hashimoto |
| 6,671,376 B1 | 12/2003 | Koto et al. |
| 6,671,388 B1 | 12/2003 | Op De Beeck et al. |
| 6,674,861 B1 | 1/2004 | Xu et al. |
| 6,674,876 B1 | 1/2004 | Hannigan et al. |
| 6,675,146 B2 | 1/2004 | Rhoads |
| 6,678,389 B1 | 1/2004 | Sun et al. |
| 6,681,029 B1 | 1/2004 | Rhoads |
| 6,683,958 B2 | 1/2004 | Petrovic |
| 6,697,944 B1 | 2/2004 | Jones et al. |
| 6,700,990 B1 | 3/2004 | Rhoads |
| 6,704,431 B1 | 3/2004 | Ogawa et al. |
| 6,707,926 B1 | 3/2004 | Macy et al. |
| 6,728,390 B2 | 4/2004 | Rhoads et al. |
| 6,737,957 B1 | 5/2004 | Petrovic et al. |
| 6,738,495 B2 | 5/2004 | Rhoads et al. |
| 6,744,906 B2 | 6/2004 | Rhoads et al. |
| 6,748,360 B2 | 6/2004 | Pitman et al. |
| 6,751,337 B2 | 6/2004 | Tewfik et al. |
| 6,757,908 B1 | 6/2004 | Vogel |
| 6,768,807 B1 | 7/2004 | Muratani |
| 6,771,797 B2 | 8/2004 | Ahmed |
| 6,785,399 B2 | 8/2004 | Fujihara |
| 6,785,401 B2 | 8/2004 | Walker et al. |
| 6,785,815 B1 | 8/2004 | Serret-Avila et al. |
| 6,792,542 B1 | 9/2004 | Lee et al. |
| 6,798,893 B1 | 9/2004 | Tanaka |
| 6,829,368 B2 | 12/2004 | Meyer et al. |
| 6,834,344 B1 | 12/2004 | Aggarwal et al. |
| 6,834,345 B2 | 12/2004 | Bloom et al. |
| 6,850,626 B2 | 2/2005 | Rhoads et al. |
| 6,856,693 B2 | 2/2005 | Miller |
| 6,880,082 B2 | 4/2005 | Ohta |
| 6,888,943 B1 | 5/2005 | Lam et al. |
| 6,891,958 B2 | 5/2005 | Kirovski et al. |
| 6,912,010 B2 | 6/2005 | Baker et al. |
| 6,912,294 B2 | 6/2005 | Wang et al. |
| 6,912,315 B1 | 6/2005 | Wong et al. |
| 6,915,002 B2 | 7/2005 | Gustafson |
| 6,915,422 B1 | 7/2005 | Nakamura |
| 6,915,481 B1 | 7/2005 | Tewfik et al. |
| 6,931,536 B2 | 8/2005 | Hollar |
| 6,944,313 B1 | 9/2005 | Donescu |
| 6,947,893 B1 | 9/2005 | Iwaki et al. |
| 6,952,774 B1 | 10/2005 | Kirovski et al. |
| 6,954,541 B2 | 10/2005 | Fan et al. |
| 6,961,854 B2 | 11/2005 | Serret-Avila et al. |
| 6,973,195 B1 | 12/2005 | Matsui |
| 6,993,154 B2 | 1/2006 | Brunk |
| 6,996,249 B2 | 2/2006 | Miller et al. |
| 7,007,166 B1 | 2/2006 | Moskowitz et al. |
| 7,020,304 B2 | 3/2006 | Alattar et al. |
| 7,024,018 B2 | 4/2006 | Petrovic |
| 7,043,049 B2 | 5/2006 | Kuzma |
| 7,043,536 B1 | 5/2006 | Philyaw et al. |
| 7,046,808 B1 | 5/2006 | Metois et al. |
| 7,054,461 B2 | 5/2006 | Zeller et al. |
| 7,054,462 B2 | 5/2006 | Rhoads et al. |
| 7,058,815 B2 | 6/2006 | Morin |
| 7,068,809 B2 | 6/2006 | Stach |
| 7,072,492 B2 | 7/2006 | Ogawa et al. |
| 7,142,691 B2 | 11/2006 | Levy |
| 7,162,642 B2 | 1/2007 | Schumann et al. |
| 7,164,778 B1 | 1/2007 | Nakamura et al. |
| 7,171,020 B2 | 1/2007 | Rhoads et al. |
| 7,177,429 B2 | 2/2007 | Moskowitz et al. |
| 7,197,368 B2 | 3/2007 | Kirovski et al. |
| 7,206,649 B2 | 4/2007 | Kirovski et al. |
| 7,231,061 B2 | 6/2007 | Bradley |
| 7,289,643 B2 | 10/2007 | Brunk et al. |
| 7,298,865 B2 | 11/2007 | Lubin et al. |
| 7,319,759 B1 | 1/2008 | Peinado et al. |
| 7,321,666 B2 | 1/2008 | Kunisa |
| 7,334,247 B1 | 2/2008 | Finseth et al. |
| 7,336,802 B2 | 2/2008 | Kunisa |
| 7,346,514 B2 | 3/2008 | Herre et al. |
| 7,369,677 B2 | 5/2008 | Petrovic et al. |
| 7,389,421 B2 | 6/2008 | Kirovski et al. |
| 7,450,727 B2 | 11/2008 | Griesinger |
| 7,454,019 B2 | 11/2008 | Williams |
| 7,581,103 B2 | 8/2009 | Home et al. |
| 7,616,776 B2 | 11/2009 | Petrovic et al. |
| 7,630,497 B2 | 12/2009 | Lotspiech et al. |
| 7,644,282 B2 | 1/2010 | Petrovic et al. |
| 7,660,991 B2 | 2/2010 | Nakamura et al. |
| 7,664,332 B2 | 2/2010 | Wong et al. |

(56) References Cited

U.S. PATENT DOCUMENTS

| | | | |
|---|---|---|---|
| 7,693,297 B2 | 4/2010 | Zhang et al. |
| 7,788,684 B2 | 8/2010 | Petrovic et al. |
| 7,840,006 B2 | 11/2010 | Ogawa et al. |
| 7,983,922 B2 | 7/2011 | Neusinger et al. |
| 7,986,806 B2 | 7/2011 | Rhoads |
| 8,059,815 B2 | 11/2011 | Lofgren et al. |
| 8,155,463 B2 | 4/2012 | Wong et al. |
| 8,467,717 B2 * | 6/2013 | Croy et al. | 455/2.01 |
| 8,589,969 B2 * | 11/2013 | Falcon | 725/13 |
| 2001/0001159 A1 | 5/2001 | Ford |
| 2001/0021926 A1 | 9/2001 | Schneck et al. |
| 2001/0022786 A1 | 9/2001 | King et al. |
| 2001/0044899 A1 | 11/2001 | Levy |
| 2002/0012443 A1 | 1/2002 | Rhoads et al. |
| 2002/0033844 A1 | 3/2002 | Levy et al. |
| 2002/0044659 A1 | 4/2002 | Ohta |
| 2002/0052885 A1 | 5/2002 | Levy |
| 2002/0053026 A1 | 5/2002 | Hashimoto |
| 2002/0054089 A1 | 5/2002 | Nicholas et al. |
| 2002/0080964 A1 | 6/2002 | Stone et al. |
| 2002/0080976 A1 | 6/2002 | Schreer |
| 2002/0082731 A1 | 6/2002 | Pitman et al. |
| 2002/0095577 A1 | 7/2002 | Nakamura et al. |
| 2002/0097873 A1 | 7/2002 | Petrovic |
| 2002/0120849 A1 | 8/2002 | McKinley et al. |
| 2002/0120854 A1 | 8/2002 | LeVine et al. |
| 2002/0126842 A1 | 9/2002 | Hollar |
| 2002/0126872 A1 | 9/2002 | Brunk et al. |
| 2002/0138734 A1 | 9/2002 | David et al. |
| 2002/0154144 A1 | 10/2002 | Lofgren et al. |
| 2002/0168087 A1 | 11/2002 | Petrovic |
| 2002/0178368 A1 | 11/2002 | Yin et al. |
| 2003/0009671 A1 | 1/2003 | Yacobi et al. |
| 2003/0012403 A1 | 1/2003 | Rhoads et al. |
| 2003/0021439 A1 | 1/2003 | Lubin et al. |
| 2003/0021441 A1 | 1/2003 | Levy et al. |
| 2003/0028796 A1 | 2/2003 | Roberts et al. |
| 2003/0031317 A1 | 2/2003 | Epstein |
| 2003/0033321 A1 | 2/2003 | Schrempp et al. |
| 2003/0037075 A1 | 2/2003 | Hannigan et al. |
| 2003/0053655 A1 | 3/2003 | Barone et al. |
| 2003/0061489 A1 | 3/2003 | Pelly et al. |
| 2003/0063747 A1 | 4/2003 | Petrovic |
| 2003/0076955 A1 | 4/2003 | Alve et al. |
| 2003/0081809 A1 | 5/2003 | Fridrich et al. |
| 2003/0112974 A1 | 6/2003 | Levy |
| 2003/0115504 A1 | 6/2003 | Holliman et al. |
| 2003/0131350 A1 | 7/2003 | Peiffer et al. |
| 2003/0179901 A1 | 9/2003 | Tian et al. |
| 2003/0185417 A1 | 10/2003 | Alattar et al. |
| 2003/0187679 A1 | 10/2003 | Odgers et al. |
| 2003/0188166 A1 | 10/2003 | Pelly et al. |
| 2003/0190054 A1 | 10/2003 | Troyansky et al. |
| 2003/0190055 A1 | 10/2003 | Kalker et al. |
| 2003/0200438 A1 | 10/2003 | Kirovski et al. |
| 2003/0223584 A1 | 12/2003 | Bradley et al. |
| 2004/0005076 A1 | 1/2004 | Hosaka et al. |
| 2004/0008864 A1 | 1/2004 | Watson et al. |
| 2004/0009763 A1 | 1/2004 | Stone et al. |
| 2004/0010692 A1 | 1/2004 | Watson |
| 2004/0015400 A1 | 1/2004 | Whymark |
| 2004/0025176 A1 | 2/2004 | Franklin et al. |
| 2004/0028255 A1 | 2/2004 | Miller |
| 2004/0042635 A1 | 3/2004 | Epstein et al. |
| 2004/0073916 A1 | 4/2004 | Petrovic et al. |
| 2004/0078575 A1 | 4/2004 | Morten et al. |
| 2004/0088556 A1 | 5/2004 | Weirauch |
| 2004/0091111 A1 | 5/2004 | Levy et al. |
| 2004/0093523 A1 | 5/2004 | Matsuzaki et al. |
| 2004/0098593 A1 | 5/2004 | Muratani |
| 2004/0101160 A1 | 5/2004 | Kunisa |
| 2004/0103293 A1 | 5/2004 | Ryan |
| 2004/0133794 A1 | 7/2004 | Kocher et al. |
| 2004/0151316 A1 | 8/2004 | Petrovic |
| 2004/0169581 A1 | 9/2004 | Petrovic et al. |
| 2004/0204943 A1 | 10/2004 | Kirovski et al. |
| 2004/0216157 A1 | 10/2004 | Shain et al. |
| 2005/0008190 A1 | 1/2005 | Levy et al. |
| 2005/0013462 A1 | 1/2005 | Rhoads |
| 2005/0120220 A1 | 6/2005 | Oostveen et al. |
| 2005/0144632 A1* | 6/2005 | Mears et al. | 725/15 |
| 2005/0196051 A1 | 9/2005 | Wong et al. |
| 2005/0202781 A1 | 9/2005 | Steelberg et al. |
| 2005/0251683 A1 | 11/2005 | Levy et al. |
| 2006/0005029 A1 | 1/2006 | Petrovic et al. |
| 2006/0062426 A1 | 3/2006 | Levy et al. |
| 2006/0227968 A1 | 10/2006 | Chen et al. |
| 2006/0239501 A1 | 10/2006 | Petrovic et al. |
| 2007/0005500 A1 | 1/2007 | Steeves et al. |
| 2007/0039018 A1 | 2/2007 | Saslow et al. |
| 2007/0110237 A1 | 5/2007 | Tehranchi et al. |
| 2007/0143617 A1 | 6/2007 | Farber et al. |
| 2007/0150418 A1 | 6/2007 | Ben-Menahem et al. |
| 2007/0192261 A1 | 8/2007 | Kelkar et al. |
| 2007/0223708 A1 | 9/2007 | Villemoes et al. |
| 2008/0002854 A1 | 1/2008 | Tehranchi et al. |
| 2008/0031463 A1 | 2/2008 | Davis |
| 2008/0310629 A1 | 12/2008 | Van Der Veen et al. |
| 2008/0313741 A1 | 12/2008 | Alve et al. |
| 2009/0031134 A1 | 1/2009 | Levy |
| 2009/0172405 A1 | 7/2009 | Shiomi et al. |
| 2009/0326961 A1 | 12/2009 | Petrovic et al. |
| 2010/0034513 A1 | 2/2010 | Nakano et al. |
| 2010/0146286 A1 | 6/2010 | Petrovic et al. |
| 2010/0226525 A1 | 9/2010 | Levy et al. |
| 2010/0228857 A1 | 9/2010 | Petrovic et al. |
| 2010/0287579 A1 | 11/2010 | Petrovic et al. |
| 2010/0287609 A1 | 11/2010 | Gonzalez et al. |
| 2011/0016172 A1 | 1/2011 | Shah |
| 2011/0202687 A1 | 8/2011 | Glitsch et al. |
| 2011/0209191 A1 | 8/2011 | Shah |
| 2011/0219229 A1 | 9/2011 | Cholas et al. |
| 2011/0225427 A1 | 9/2011 | Wood et al. |
| 2011/0286625 A1 | 11/2011 | Petrovic et al. |
| 2011/0293090 A1 | 12/2011 | Ayaki et al. |
| 2011/0311056 A1 | 12/2011 | Winograd |
| 2012/0017091 A1 | 1/2012 | Petrovic et al. |
| 2012/0026393 A1 | 2/2012 | Petrovic et al. |
| 2012/0072729 A1 | 3/2012 | Winograd et al. |
| 2012/0072730 A1 | 3/2012 | Winograd et al. |
| 2012/0072731 A1 | 3/2012 | Winograd et al. |
| 2012/0084870 A1 | 4/2012 | Petrovic |
| 2012/0130719 A1 | 5/2012 | Petrovic et al. |

FOREIGN PATENT DOCUMENTS

| | | |
|---|---|---|
| EP | 372601 A1 | 6/1990 |
| EP | 581317 A2 | 2/1994 |
| GB | 2260246 A | 4/1993 |
| GB | 2292506 A | 2/1996 |
| GB | 2363027 A | 12/2001 |
| JP | 10-150548 A | 6/1998 |
| JP | 11-086435 A | 3/1999 |
| JP | 11-284516 A | 10/1999 |
| JP | 11-346302 A | 12/1999 |
| JP | 2000-069273 A | 3/2000 |
| JP | 2000083159 A | 3/2000 |
| JP | 2000-174628 A | 6/2000 |
| JP | 2000216981 A | 8/2000 |
| JP | 2001022366 A | 1/2001 |
| JP | 2001-119555 A | 4/2001 |
| JP | 2001175270 A | 6/2001 |
| JP | 2001-188549 A | 7/2001 |
| JP | 2001-216763 A | 8/2001 |
| JP | 2001-218006 A | 8/2001 |
| JP | 2001-312570 A | 11/2001 |
| JP | 2001-527660 A | 12/2001 |
| JP | 2002-010057 A | 1/2002 |
| JP | 2002-024095 A | 1/2002 |
| JP | 2002-027223 A | 1/2002 |
| JP | 2002-091465 A | 3/2002 |
| JP | 2002135557 A | 5/2002 |
| JP | 2002-165191 A | 6/2002 |
| JP | 2002-519916 A | 7/2002 |

(56) References Cited

FOREIGN PATENT DOCUMENTS

| | | | |
|---|---|---|---|
| JP | 2002-232693 A | | 8/2002 |
| JP | 2002232412 A | | 8/2002 |
| JP | 2003-008873 A | | 1/2003 |
| JP | 2003-039770 A | | 2/2003 |
| JP | 2003-091927 A | | 3/2003 |
| JP | 2003-230095 A | | 8/2003 |
| JP | 2003-244419 A | | 8/2003 |
| JP | 2003-283802 A | | 10/2003 |
| JP | 2004-023786 A | | 1/2004 |
| JP | 2004-163855 A | | 6/2004 |
| JP | 2004173237 A | | 6/2004 |
| JP | 2004-193843 A | | 7/2004 |
| JP | 2004-328747 A | | 11/2004 |
| JP | 2005-094107 A | | 4/2005 |
| JP | 2005525600 A | | 8/2005 |
| WO | 94-10771 | | 5/1994 |
| WO | 95-14289 | | 5/1995 |
| WO | 97-09797 | | 3/1997 |
| WO | 97-33391 | | 9/1997 |
| WO | 98-53565 | | 11/1998 |
| WO | 99-03340 | | 1/1999 |
| WO | 99-39344 | | 5/1999 |
| WO | 99-45706 | | 10/1999 |
| WO | 99-62022 | | 12/1999 |
| WO | 00-00969 | | 1/2000 |
| WO | 00-13136 | | 3/2000 |
| WO | 00-56059 | | 9/2000 |
| WO | 01-54035 | | 7/2001 |
| WO | 01-55889 | | 8/2001 |
| WO | 0197128 | A1 | 12/2001 |
| WO | 0223883 | A2 | 3/2002 |
| WO | 0249363 | A1 | 6/2002 |
| WO | 02095727 | A1 | 11/2002 |
| WO | 03052598 | A1 | 6/2003 |
| WO | 2005-027501 | | 3/2005 |
| WO | 2006051043 | A1 | 5/2006 |
| WO | 2006116394 | A2 | 11/2006 |
| WO | 2010073236 | A1 | 7/2010 |

OTHER PUBLICATIONS

Kocher, P., et al., "Self-Protecting Digital Content: A Technical Report from the CRI Content Security Research Initiative," Cryptography Research, Inc. (CRI), 2002-2003 (14 pages).
Kutter, M., et al., "The watermark copy attack," Proc. of the SPIE: Security and Watermarking of Multimedia Content II, 3971:1-10, Jan. 2000.
Kuznetsov, A.V., et al., "An error correcting scheme for defective memory," IEEE Trans. Inf. Theory, 6(4):712-718, Nov. 1978 (7 pages).
Lacy, J., et al., "Intellectual property protection systems and digital watermarking," Proceedings: Information Hiding, Second International Workshop, Portland, Oregon, pp. 158-168, 1998.
Lin, E.T., et al., "Detection of image alterations using semi-fragile watermarks," Proceedings of the SPIE International Conference on Security and Watermarking of Multimedia Contents II, Jan. 2000 (12 pages).
Lin, P.L., et al., "Robust transparent image watermarking system with spatial mechanisms," The Journal of Systems and Software, 50:107-116, Feb. 2000.
Lotspeich, J., "The Advanced Access Content System's Use of Digital Watermarking," MCPS '06, Oct. 28, 2006, pp. 19-21.
Lu, C.S., et al., "Oblivious cocktail watermarking by sparse code shrinkage: A regional-and global-based scheme," IEEE Transactions on Multimedia, 4(2):209-224, Dec. 2000.
Maehara, F., et al., "A proposal of multimedial home education terminal system based on flash-squeak OS," Technical report of the institute of image information and television engineers, 28(43):21-24, Jul. 2004.
Mason, A. J., et al., "User requirements for watermarking in broadcast applications," IEEE Conference Publication, International Broadcasting Convention (BC 2000), Amsterdam, Sep. 8-12, 2000 (7 pages).
Mintzer, F., et al., "If one watermark is good, are more better?," Acoustics, Speech, and Signal Processing, ICASSP, 4:2067-2069, Mar. 1999.
Mobasseri, B.G., et al. "Content authentication and tamper detection in digital video," Image Processing Proceedings, International Conference, 1:458-461, 2000.
Moulin, P., et al., "Detection-theoretic analysis of desynchronization attacks in watermarking," Technical Report MSR-TR-2002-24, Microsoft Corporation, Mar. 2002.
Muranoi, R., et al., "Video retrieval method using shotID for copyright protection systems," Proc. SPIE Multimedia Storage and Archiving Systems III, 3527:245-252, Nov. 1998.
Nikolaidis, N., et al., "Watermark detection: benchmarking perspectives," 2002 IEEE Conference on Multimedia and Expo, 2002 (4 pages).
Office Action dated Mar. 16, 2012 for Japanese Patent Application No. 2008-508985 (8 pages).
Office Action dated Jul. 21, 2011 for Japanese Patent Application No. 2008-508985 (6 pages).
Office Action dated Mar. 18, 2011 for European Patent Application No. 03774648.4 (6 pages).
Office Action dated May 8, 2012 for Japanese Patent Application No. 2009-522802 (4 pages).
Park, J.H., et al., "Robust and fragile watermarking techniques for documents using bidirectional diagonal profiles," Information and Communications Security: Third International Conference, Xian, China, Nov. 2001, pp. 483-494.
Perez-Gonzalez, F., et al., "Approaching the capacity limit in image watermarking a perspective on coding techniques for data hiding applications," Signal Processing, 6(81):1215-1238 Jun. 2001.
Petitcolas, F., et al., "The blind pattern matching attack on watermark systems," IEEE Trans. Signal Processing, Apr. 2003 (4 pages).
Petitcolas, F.A.P., et al., "Attacks on copyright marking systems," Second Workshop on Information Hiding, Lecture Notes in Computer Science, Portland, Oregon, pp. 218-238, Apr. 1998.
Philips Research Liquid Audio Fraunhofer Institute, "Digital Audio Screening Technology for Phased Rollout," Version 1.00, May 1999 (38 pages).
Pytlak, J.,"Anti-piracy coding," URL:http://www.tele.com/pipermail/tig/2003-November/003842.html; Nov. 2003 (2 pages).
RSA Laboratories, "Frequently asked questions about today's cryptography," Version 4.1, May 2000 (37 pages).
Schneier, B., "Applied cryptography, second edition: protocols, algorithms and source code in C," Oct. 1995 (10 pages).
Shih, F.Y., et al., "Combinational, image watermarking in the spatial and frequency domains," Pattern Recognition, 36:696-975, May 2002.
Solanki, K., et al., "Robust image-adaptive data hiding: modeling, source coding and channel coding", 41st Allerton Conference on Communications, Control and Computing, Oct. 2003 (10 pages).
Steinebach, M., et al., "StirMark benchmark: audio watermarking attacks," International Conference on Information Technology: Coding and Computing (ITCC 2001), Las Vegas, Nevada, Apr. 2001 (6 pages).
Tanaka, K., et al., "Secret transmission method of character data in motion picture communication," SPIE Visual Communications and Image Processing '91, 1605:646-649, 1991.
Tsai, M.J., et al., "Wavelet packet and adaptive spatial transformation of watermark for digital image authentication," IEEE Image Processing, 2000 International Conference, 1:450-453, 2000 (4 pages).
Verance Corporation, "Confirmedia," PowerPoint presentation made to National Association of Broadcasters; Apr. 24, 2001 (40 pages).
Xu, C., et al., "Applications of digital watermarking technology in audio signals," Journal of Audio Eng. Soc., 10 (47):805-812, Oct. 1999.
Yeung, M. M., et al., "An invisible watermarking technique for image verification," Image Processing, International Conference Proceedings, 2:680-683, Oct. 26-29, 1997.
Zhao, J., "A WWW service to embed and prove digital copyright watermarks," Proc. European Conf. on Multimedia Applications, Services and Techniques (ECMAST'96), May 1996 (15 pages).

(56) References Cited

OTHER PUBLICATIONS

Zhao, J., "Applying digital watermarking techniques to online multimedia commerce," Proc. Int. Conf. on Imaging Science, Systems and Applications (CISSA'97), Jun./Jul. 1997 (7 pages).
"Advanced Access Content System (AACS), Pre-recorded Video Book," Revision 0.951, Sep. 2009 (86 pages).
"Content Protection—Self Protecting Digital Content," http://www.cryptography.com/technology/spdc/index.html, May 2010 (1 page).
"Microsoft response to CfP for technology solutions to screen digital audio content for LCM acceptance," Microsoft Corporation, May 23, 1999 (9 pages).
"Task AC122-copy protection for distribution services," Http://acad.bg/WISE/english/rd/partners/acts/areal/ac122-t.html, Jul. 1, 1997 (2 pages).
Adelsbach, A., et al., "Proving Ownership of Digital Content," Proc. 3rd Int. Workshop on Information Hiding, 1768:117-133, Sep. 1999.
Aggarwal, A., et al., "Multi-Layer Grid Embeddings," Foundations of Computer Science, 26th Annual Symposium on Foundations of Computer Science, 85:186-196, Oct. 1985.
Aris Technologies, Inc. "Audio Watermarking System to Screen Digital Audio Content for LCM Acceptance," May 1999 (17 pages).
Barreto, P.S.L.M., et al. "Toward Secure Public-Key Blockwise Fragile Authentication Watermarking," IEEE Proceedings Vision, Image, and Signal Processing, 149(2):57-62, Apr. 2002.
Boney, L., et al., "Digital Watermarks for Audio Signals," Dept. of Electrical Engineering, Univ. of Minnesota, Mar. 1996 (4 pages).
Cappellini, V., et al. "Robust Frame-based Watermarking for Digital Video," Proceedings of the 12th International Workshop on Database and Expert Systems Applications, Sep. 2001 (5 pages).
Caronni, G., "Assuring Ownership Rights for Digital Images," Proceedings of reliable IT systems VIS 95, Vieweg Publishing Company, Germany, 1995 (10 pages).
Chen, B. et al., "Quantization index modulation: a class of provably good methods for digital watermarking and information embedding," IEEE Transactions on Information Theory, 47(4):1423-1443 May 2001.
Chou, J., et al., "A Robust Blind Watermarking Scheme based on Distributed Source Coding Principles," Multimedial 2000 Proceedings of the eighth ACM international conference on multimedia, Los Angeles, California, 2000 (8 pages).
Chou, J., et al., "A Robust Optimization Solution to the Data Hiding Problem using Distributed Source Coding Principles," Pro. SPIE, 3971, San Jose, California, Jan. 2000 (10 pages).
Cinea, Inc., "Forensic watermarking deterring video piracy," 2004, (9 pages). [http://www.cinea.com/whitepapers/forensic_watermarking.pdf].
Costa, M., "Writing on Dirty Paper," IEEE Trans. on Info. Theory, 29(3):439-441, May 1983.
Cox, I. J., et al., "Some general methods for tampering with watermarks," IEEE Journal on Selected Areas in Communications, 16(4): 587-593, May 1998.
Coxford, A., et al., "Advanced Mathematics: A Preparation for Calculus, Second Edition," Harcourt Brace Jovanovish, Inc., 1978 (14 pages).
Das, et al., "Distributed Priority Queues on Hybercube Architectures," IEEE, 1996, pp. 620-627.
Davidson, M.F., "Music File Filter," Sony Music, New York, May 23, 1999 (2 pages).
Digimarc Corporation, "Digimarc Watermarking Guide," 1999 (22 pages).
Dittmann, J., "Combining digital watermarks and collusion secure fingerprints for customer copy monitoring," Proc. IEEE Seminar on Secure Images and Image Authentication, Apr. 2000 (6 pages).
Dittmann, J., et al., "Combining digital watermarks and collusion secure fingerprints for digital images," Proc. SPIE 3657:171-182, Jan. 1999 (12 pages).
Epp, L.W., et al., "Generalized scattering matrices for unit cell characterization of grid amplifiers and device de-embedding," IEEE, 2:1288-1291, Jun. 1995.

European Search Report dated Apr. 12, 2012 for European Patent Application No. 07836262.1 filed Jul. 25, 2007 (12 pages).
European Search Report dated Nov. 10, 2010 for European Patent Application No. 03774648.4, filed Oct. 7, 2003 (5 pages).
European Search Report dated Jul. 3, 2012 for European Patent Application No. 12150742.0, filed Oct. 7, 2003 (5 pages).
Furon, T., et al., "An asymmetric watermarking method," IEEE Trans. Signal Processing, 4(51):981-995, Apr. 2003.
Guth H.J. et al., "Error-and collusion-secure fingerprinting for digital data," Proc. 3rd Int. Workshop on Information Hiding, LNCS 1768:134-145, Sep./Oct. 1999.
Hartung, F., et al., "Digital watermarking of MPEG-2 coded video in the bitstream domain," Proc. IEEE Int. Conf. on Acoustics, Speech and Signal Processing, 4:2621-2624, Apr. 1997.
Hartung, F., et al., "Watermarking of MPEG-2 encoded video without decoding and re-coding," Proc. SPIE Multimedia Computing and Networking 97, 3020:264-274, Feb. 1997.
Hartung, F., et al., "Watermarking of uncompressed and compressed video," Signal Processing, 3(66):283-301, May 1998.
Heegard, C., et al., "On the capacity of computer memory with defects," IEEE Trans. Info. Theory, 5(IT-29):731-739, Sep. 1983.
International Search Report and Written Opinion dated Apr. 24, 2012 for International Application No. PCT/US2011/051857, filed Sep. 15, 2011 (9 pages).
International Search Report and Written Opinion dated Aug. 14, 1998 for International Application No. PCT/US1998/009587, filed May 12, 1998 (3 pages).
International Search Report and Written Opinion dated Aug. 22, 2007 for International Application No. PCT/US2006/031267, filed Aug. 9, 2006 (2 pages).
International Search Report and Written Opinion dated Feb. 14, 2002 for International Application No. PCT/US2001/026505, filed Aug. 27, 2001 (2 pages).
International Search Report and Written Opinion dated Jan. 4, 2008 for International Application No. PCT/US2006/015615, filed Apr. 25, 2006 (5 pages).
International Search Report and Written Opinion dated Mar. 28, 2012 for International Application No. PCT/US2011/051855, filed Sep. 15, 2011 (8 pages).
International Search Report and Written Opinion dated May 13, 2008 for International Application No. PCT/US2006/025090, filed Jun. 27, 2006 (2 pages).
International Search Report and Written Opinion dated May 19, 2004 for International Application No. PCT/US2003/031816, filed Apr. 29, 2004 (3 pages).
International Search Report and Written Opinion dated May 29, 2008 for International Application No. PCT/US2006/015410, filed Apr. 21, 2006 (6 pages).
International Search Report and Written Opinion dated Sep. 26, 2008 for International Application No. PCT/US2007/016812, filed Jul. 25, 2007 (6 pages).
Jacobsmeyer, J., et al., "Introduction to error-control coding," Pericle Communications Company, 2004 (16 pages).
Kalker, T., et al., "A security risk for publicly available watermark detectors," Proc. Benelux Info. Theory Symp., Veldhoven, The Netherlands, May 1998 (7 pages).
Kalker, T., et al., "System issues in digital image and video watermarking for copy protection," Proc. IEEE Int. Conf. on Multimedia Computing and Systems, pp. 562-567, Jun. 1999.
Kang, X., et al., "A DWT-DFT composite watermarking scheme robust to both affine transform and JPEG compression," IEEE Transactions on Circuits and Systems for Video Technology, 8(13):776-786 Aug. 2003.
Kim, T.Y., et al., "An asymmetric watermarking system with many embedding watermarks corresponding to one detection watermark," IEEE Signal Processing Letters, 3(11):375-377, Mar. 2004.
Kirovski, D., et al., "Multimedia content screening using a dual watermarking and fingerprinting system," Proceedings of the tenth ACM international conference, pp. 372-381, 2002.
Kirovski, D., et al., "Randomizing the replacement attack," ICASSP, pp. 381-384, 2004.

\* cited by examiner

TIME VARYING EVALUATION OF MULTIMEDIA CONTENT

FIELD OF INVENTION

The present application generally relates to the field of multimedia content presentation, analysis and feedback.

BACKGROUND

The use and presentation of multimedia content on a variety of mobile and fixed platforms have rapidly proliferated. By taking advantage of storage paradigms, such as cloud-based storage infrastructures, reduced form factor of media players, and high-speed wireless network capabilities, users can readily access and consume multimedia content regardless of the physical location of the users or the multimedia content.

A multimedia content, such as an audiovisual content, often consists of a series of related images which, when shown in succession, impart an impression of motion, together with accompanying sounds, if any. Such a content can be accessed from various sources including local storage such as hard drives or optical disks, remote storage such as Internet sites or cable/satellite distribution servers, over-the-air broadcast channels, etc. In some scenarios, such a multimedia content, or portions thereof, may contain only one type of content, including, but not limited to, a still image, a video sequence and an audio clip, while in other scenarios, the multimedia content, or portions thereof, may contain two or more types of content.

SUMMARY

The disclosed embodiments relate to methods, devices and computer program products that facilitate enhanced use and interaction with a multimedia content. One aspect of the disclosed embodiments relates to a method that comprises obtaining, at a second device, one or more timing information associated with at least a portion of a multimedia content while the multimedia content is being presented by a first device, where the timing information identifies temporal location(s) of one or more segments of the multimedia content within a timeline of the multimedia content. The method also includes receiving feedback regarding the multimedia content from a user interface of the second device while the multimedia content is being presented by a first device, where the received feedback is not initiated based upon the timing information. Such a method additionally comprises associating the received feedback with at least one of the obtained timing information, transmitting the received feedback and the associated timing information to a database, and receiving a response corresponding to feedback provided by a plurality of consumers of the multimedia content on a segment-by-segment basis.

In one exemplary embodiment, the timing information is obtained from time codes associated with a wireless transmission of the multimedia content. In another exemplary embodiment, the timing information is obtained from time codes associated with the multimedia content as stored on an optical data storage medium. In another exemplary embodiment, the timing information is obtained from watermarks embedded in the portion(s) of the multimedia content. In still another embodiment, the timing information is obtained by computing one or more fingerprints for the portions portion(s) of the multimedia content, and comparing the computed fingerprints with a sequence of fingerprints stored at a fingerprint database.

According to another exemplary embodiment, synchronization with the multimedia content is established using the timing information obtained from a plurality of synchronization channels. For example, synchronization is established by selecting one of the plurality of synchronization channels based on a reliability ranking of the plurality of the synchronization channels. In one exemplary embodiment, the above note method further comprises obtaining identification information associated with the multimedia content. For instance, the identification information can be obtained using watermarks embedded in the portion(s) of the multimedia content. In another example embodiment, the identification information is obtained by computing one or more fingerprints for the portions portion(s) of the multimedia content, and comparing the computed fingerprints with a sequence of fingerprints stored at a fingerprint database.

In one exemplary embodiment, receiving the feedback comprises detecting a motion of at least one of: a user of the second device and the second user device. In another exemplary embodiment, receiving the feedback comprises obtaining a video and/or an audio signal of a user of the second device, and processing the video and/or the audio signal to discern the user's preferences of the multimedia content.

According another embodiment, the above noted method further includes transmitting an indication of lack of received feedback for one or more segments of the multimedia content to the database. In one exemplary embodiment, the above noted method further comprising transmitting one or more of the following to the database: an identification information associated with the second device, an identification information associated with a user of the second device, a duration of multimedia content viewing prior to receiving the feedback, information indicative of successful or unsuccessful acquisition of timing information for the one or more multiple segments of the multimedia content, and comments provided by a user of the second device.

In another exemplary embodiment, the response includes one or more of the following: aggregated results or statistical summaries of the feedback provided by the plurality of consumers for each segment of the multimedia content, information corresponding to yet-to-be-presented segments of the multimedia content, and information corresponding to feedback provided by a subset of the plurality of consumers. In yet another exemplary embodiment, the above noted method further includes receiving additional information associated with the multimedia content based on the obtained timing information, where the additional information comprises one or more of: information associated with a character appearing in a particular segment of the multimedia content that is being presented, and information associated with a scene in a particular segment of the multimedia content that is being presented.

According to one exemplary embodiment, the above noted method further comprises receiving one or more of: a reward based on the obtained timing information, and an opportunity for purchasing an item based on the obtained timing information. In another exemplary embodiment, the above noted method further comprises: receiving the transmitted feedback and the associated timing information at the database, processing the feedback and the associated timing information at the database to produce at least a portion of the response, and transmitting the response from the database to the second device.

Another aspect of the disclosed embodiments relates to a device that includes a processor and a memory that includes processor executable code. The processor executable code, when executed by the processor, configures the device to obtain one or more timing information associated with at least a portion of a multimedia content while the multimedia content is being presented by a different device, where the timing information identifies temporal location(s) of one or more segments of the multimedia content within a timeline of the multimedia content. The processor executable code, when executed by the processor, also configures the device to receive feedback regarding the multimedia content from a user interface of the device while the multimedia content is being presented by the different device, where the received feedback is not initiated based upon the timing information. The processor executable code, when executed by the processor, additionally configures the device to associate the received feedback with at least one of the obtained timing information, transmit the received feedback and the associated timing information to a database, and receive a response, the response corresponding to feedback provided by a plurality of consumers of the multimedia content on a segment-by-segment basis.

Another aspect of the disclosed embodiments relates to a computer program product, embodied on a non-transitory computer readable medium, that includes program code for obtaining one or more timing information associated with at least a portion of a multimedia content while the multimedia content is being presented by a first device, where the timing information identifies temporal location(s) of one or more segments of the multimedia content within a timeline of the multimedia content. The computer program product further includes program code for receiving feedback regarding the multimedia content from a user interface of the second device while the multimedia content is being presented by the first device, where the received feedback is not initiated based upon the timing information. The computer program product additionally includes program code for associating the received feedback with at least one of the obtained timing information, program code for transmitting the received feedback and the associated timing information to a database, and program code for receiving a response, where the response corresponds to feedback provided by a plurality of consumers of the multimedia content on a segment-by-segment basis.

Another aspect of the disclosed embodiments relates to a system that includes a timing information detector configured to obtain one or more timing information associated with at least a portion of a multimedia content while the multimedia content is being presented by a first device, where the timing information identifies temporal location(s) of one or more segments of the multimedia content within a timeline of the multimedia content. The above noted system additionally includes a user interface configured to receive user feedback regarding the multimedia content, where the user feedback is not initiated based upon the timing information, and a synchronization component configured to associate the received feedback with at least one of the obtained timing information. The above noted system also includes a communication unit configured to transmit the received user feedback and the associated timing information to a database and to receive a response corresponding to feedback provided by a plurality of consumers of the multimedia content on a segment-by-segment basis. The above noted system can be implemented within a single device, or as part of multiple devices, such as in a distributed system.

In one exemplary embodiment, the timing information detector is configured to obtain one or more timing information from time codes associated with a wireless transmission of the multimedia content. In another exemplary embodiment, the timing information detector is configured to obtain one or more timing information from time codes associated with the multimedia content as stored on an optical data storage medium. In still another exemplary embodiment, the timing information detector is configured to obtain one or more timing information from watermarks embedded in the portion(s) of the multimedia content. In yet another exemplary embodiment, the timing information detector is configured to obtain one or more timing information by computing one or more fingerprints for the portions portion(s) of the multimedia content, and comparing the computed fingerprints with a sequence of fingerprints stored at a fingerprint database.

In another exemplary embodiment, the synchronization component is configured to establish synchronization with the multimedia content by using the timing information obtained from a plurality of synchronization channels. For example, the synchronization component can be configured to establish synchronization by selecting one of the plurality of synchronization channels based on a reliability ranking of the plurality of the synchronization channels. In one embodiment, the above noted system further includes an identification code extractor that is configured to obtain identification information associated with the multimedia content. For example, the identification code extractor can be configured to obtain the identification information using watermarks embedded in the portion(s) of the multimedia content. In another example, the identification code extractor is configured to obtain the identification information is obtained by computing one or more fingerprints for the portions portion(s) of the multimedia content, and comparing the computed fingerprints with a sequence of fingerprints stored at a fingerprint database.

According to another exemplary embodiment, the user feedback comprises detecting a motion of at least one of: a user of the system and a component of the system. In yet another exemplary embodiment, at least a portion of the user feedback is received as a video and/or an audio signal of a user of the system, and the system further comprises a processor configured to process the video and/or the audio signal to discern the user's preferences of the multimedia content. In one exemplary embodiment, the communication unit is further configured to transmit an indication of lack of received user feedback for one or more segments of the multimedia content to the database. In another exemplary embodiment, the communication unit is further configured to transmit one or more of the following to the database: an identification information associated with the second device, an identification information associated with a user of the second device, a duration of multimedia content viewing prior to receiving the feedback, information indicative of successful or unsuccessful acquisition of timing information for the one or more multiple segments of the multimedia content, and comments provided by a user of the second device.

In another exemplary embodiment, the communication unit is further configured to receive additional information associated with the multimedia content based on the obtained timing information, where the additional information comprises one or more of information associated with a character appearing in a particular segment of the multimedia content that is being presented, and information associated with a scene in a particular segment of the multimedia content that is being presented. In one exemplary embodiment, the communication unit is further configured to receive one or more of: a reward based on the obtained timing information, and an opportunity for purchasing an item based on the obtained timing information. In another exemplary embodiment, the above noted system further includes a remote server that includes the database. The remote sever further comprises a receiver configured to receive the transmitted user feedback and the associated timing information, a processor configured to process the feedback and the associated timing information to produce at least a portion of the response, and a transmitter configured to transmit the response from the database. In another embodiment, the above noted system further includes a third device that is configure to receive the response corresponding to feedback provided by the plurality of consumers of the multimedia content on a segment-by-segment basis.

DETAILED DESCRIPTION OF CERTAIN EMBODIMENTS

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Figure 1:
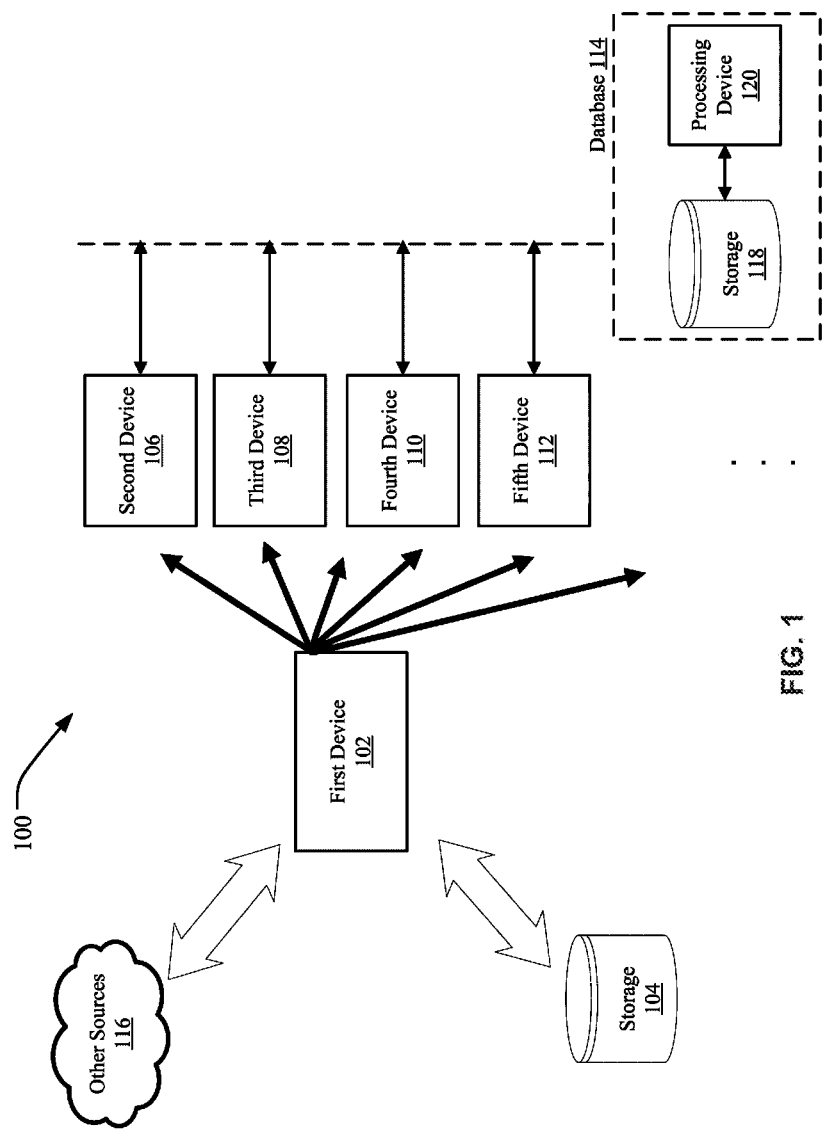
FIG. 1 illustrates a system that can accommodate certain disclosed embodiments.

FIG. 1 illustrates a system 100 that can accommodate the disclosed embodiments. The system 100 includes a first device 102 that is configured to present a multimedia content. The content can be an entertainment content, such as a movie or a TV show, a live broadcast, such as a political debate or a sporting event, a news program, an advertisement, and the like. The first device 102 can be coupled to, or include, a display screen, a projector screen, one or more speakers and the associated circuitry and/or software components to enable the reception, processing and presentation of a multimedia content. The first device 102 may also be in communication with a storage 104 unit. The storage 104 unit can be any one of, or a combination of, a local and a remote (e.g., cloud-based) storage device. The storage 104 unit can store a variety of multimedia content, meta data, applications, instructions, etc., which may be stored on magnetic, optical, semiconductor and/or other types of memory devices. The first device 102 may, alternatively or additionally, be configured to receive multimedia content and metadata through one or more other sources 116, such as through the Internet, through a terrestrial broadcast channel, through a cable network, through a home network (e.g., a Digital Living Network Alliance (DLNA) compliant network), through a wired or wireless network (e.g., a local area network (LAN), wireless LAN (WLAN), a wide area network (WAN) and the like). Such a media content can also be a real-time (e.g., streaming) content that is broadcast, unicast or otherwise provided to the first device 102. The received content can be at least partially stored and/or buffered before being presented by the first device 102.

Referring again to FIG. 1, at least a portion of the multimedia content that is presented by the first device 102 is received by at least one other device, such as the second device 106. At least a portion of the first media content that is presented by the first device 102 may be received by devices other than the second device 106 (if present), such as the third device 108, fourth device 110, fifth device 112, etc. The terms "secondary device" or "secondary devices" are sometimes used to refer to one or more of the second device 106, third device 108, fourth device 110, fifth device 112, etc. In some embodiments, additional systems similar to the system 100 of FIG. 1 can simultaneously access and present the same content. For example, the system 100 of FIG. 1 can reside at a first household while a similar system can reside at a second household, both accessing the same content (or different contents) and presenting them to a plurality of devices or users of the devices.

One or more of the second 106, the third 108, the fourth 110, the fifth 112, etc., devices is in communication with a database 114. The database 114 includes one or more storage 118 devices for storage of a variety of multimedia content, meta data, survey results, applications, instructions, etc., which may be stored on magnetic, optical, semiconductor and/or other types of memory devices. The database 114 can, for example, include a remote (e.g., cloud-based) storage device. The database 114 can further include, or be in communication with, one or more processing devices 120, such as a computer, that is capable of receiving and/or retrieving information, data and commands, processing the information, data, commands and/or other information, and providing a variety of information, data, commands. In some embodiments, the one or more processing devices 120 are in communication with the one or more of the secondary devices and can, for example, send/receive data, information and commands to/from the secondary devices.

In one specific example, the first device 102 is a television set that is configured to present a video content and an associated audio content, and at least one of the secondary devices is a portable media device (e.g., a smart phone, a tablet computer, a laptop, etc.) that is equipped to receive the audio portions of the presented content through a an interface, such as a microphone input. In this specific example, each of the secondary devices can be further configured to process the captured audio content, process the audio content to detect particular information, such as identification information, synchronization and timing information, and the like, and to further present a variety of information and content to the user to enhance the viewing experience of the user. In other exemplary scenarios, one or more of the secondary devices are configured to receive at least a portion of the content presented by the first device 102: (a) by capturing a portion of the presented video, (b) through wireless transmissions (e.g., 802.11 protocol, Infrared transmissions, etc.) from the first device 102, and/or (c) through wired transmissions that are provided by the first device 102. These various transmission channels and mechanisms for conveying one or more segments of the content (or information such as time codes associated with the content) to the secondary devices are shown in FIG. 1 as arrows that originate from the first device 102 in the direction of the second 106, the third 108, the fourth 110, the fifth 112, etc., devices.

In some embodiments, one of the secondary devices is the source of multimedia content that is presented by the first device 102. For example, a wireless link can be established between the second device 106 and the first device 102 (or between the second device 106 and an auxiliary device, such as a tuner, a cable box receiver, and the like, in communication with the first device 102) in order to allow the first device 102 to receive the content from the second device 106 and to present the content to one or more of the third device 108, fourth device 110, fifth device 112, etc.

Figure 2:
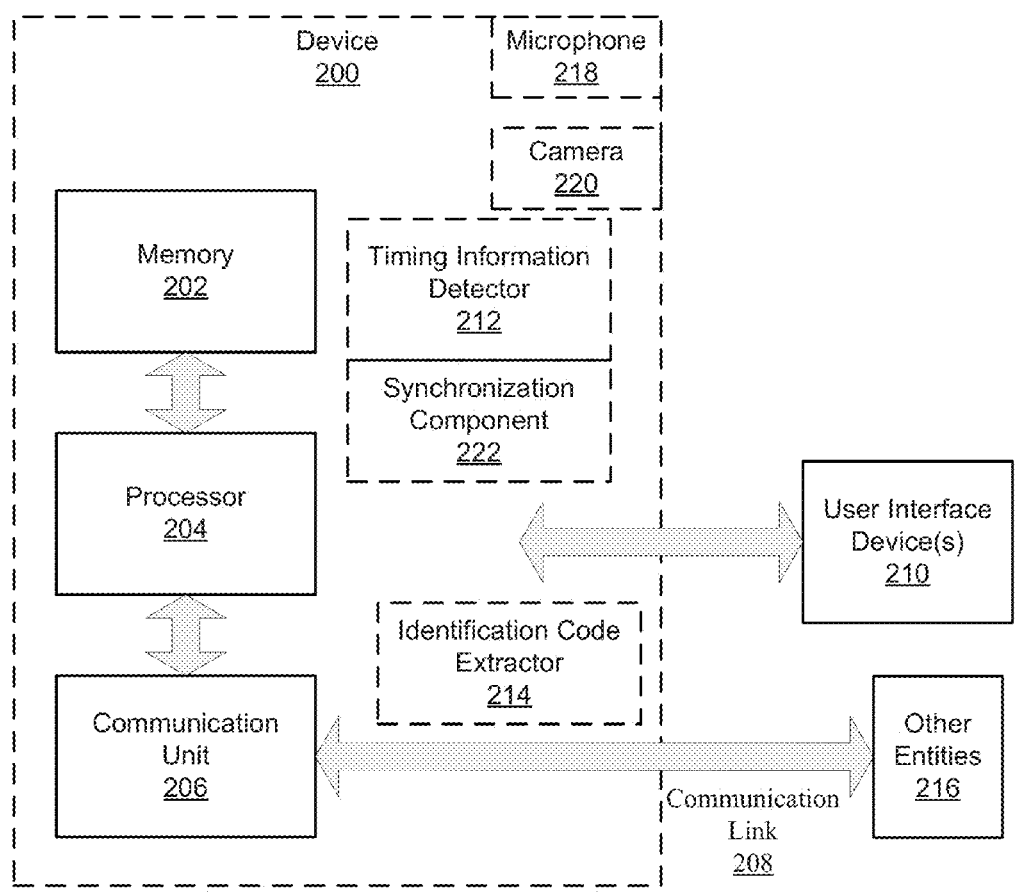
FIG. 2 illustrates a block diagram of a device within which certain disclosed embodiments may be implemented.

FIG. 2 illustrates a block diagram of a device 200 within which certain disclosed embodiments may be implemented. The exemplary device 200 that is depicted in FIG. 2 may be, for example, incorporated as part of the secondary devices that are illustrated in FIG. 1. The device 200 comprises at least one processor 204 and/or controller, at least one memory 202 unit that is in communication with the processor 204, and at least one communication unit 206 that enables the exchange of data and information, directly or indirectly, through the communication link 208 with at least other entities, devices, databases and networks (collectively illustrated in FIG. 2 as Other Entities 216). The communication unit 206 of the device 200 can also include a number of input and output ports that can be used to receive and transmit information from/to a user and other devices or systems. The communication unit 206 may provide wired and/or wireless communication capabilities in accordance with one or more communication protocols and, therefore, it may comprise the proper transmitter/receiver antennas, circuitry and ports, as well as the encoding/decoding capabilities that may be necessary for proper transmission and/or reception of data and other information. In some embodiments, the device 200 can also include a microphone 218 that is configured to receive an input audio signal.

In some embodiments, the device 200 can also include a camera 220 that is configured to capture a video and/or a still image. The signals generated by the microphone 218 and the camera 220 may be further undergo various signal processing operations, such as analog to digital conversion, filtering, sampling, and the like. It should be noted that while the microphone 218 and/or camera 220 are illustrated as separate components, in some embodiments, the microphone 218 and/or camera 220 can be incorporated into other components of the device 200, such as the communication unit 206. The received audio, video and/or still image signals can be processed (e.g., converted from analog to digital, color correction, sub-sampled, evaluated to detect embedded watermarks, analyzed to obtain fingerprints etc.) under the control of the processor 204. In some embodiments, instead of, or in addition to, a built-in microphone 218 and camera 220, the device 200 may be equipped with an input audio port and an input/output video port that can be interfaced with an external microphone and camera, respectively.

The device 200 is also coupled to one or more user interface devices 210, including but not limited to a display device, a keyboard, a speaker, a mouse, a touch pad, a motion sensors, a physiological sensor, and the like. The user interface device(s) 210 allow a user of the device to input information, such as feedback regarding the presented first content, and to receive information from for, example, the database 114. While in the exemplary block diagram of FIG. 2 the user interface devices 210 are depicted as residing outside of the device 200, it is understood that, in some embodiments, one or more of the user interface devices 210 may be implemented as part of the device 200. Moreover, the user interface devices may be in communication with the device 200 through the communication unit 206.

The device 200 also includes a timing information detector 212 that is configured to obtain timing information associated with the content that the device 200 is exposed to. For example, the timing information detector 212 can include a watermark extractor that is configured to detect watermarks that are embedded in an audio, video, or text components of a multimedia content, and to, for example, obtain timing information and content identification information from the embedded watermarks. The timing information detector 212 can include a fingerprint computation component that is configured to compute fingerprints for received segments of multimedia content (or components therein) and to communicate the computed fingerprint values (e.g., through the communication unit 206) to a fingerprint database for obtaining timing information and/or content identification information.

The device 200 also includes a synchronization component 222 that is configured to at least synchronize or associate the feedback that is received from a user of the device 200 with the timing information that is obtained by the timing information detector 212. The device 200 can also include an identification extractor 214 that is configured to determine identification information associated with the content that is being presented to, or is accessible by, the device 200. Further details regarding timing and synchronization operations, as well as extraction of identification information are discussed in the sections that follow. It should be noted that while the timing information detector 212, the synchronization component 222 and the identification code extractor 214 are illustrated as separate components in FIG. 2, one or more of these components can be combined together and/or implemented as part another component of the device 200.

Referring back to FIG. 1, in some exemplary embodiments, a content that is presented by the first device is presented to one or more users of the secondary devices. For example, the content is presented by a television set (first device) to a user that is possession of a handheld device (second device), such as a smartphone. The second device is capable of determining synchronization and timing information associated with the presented content and to enhance the viewing experience of the user based on, for example, the feedback that it receives from the user and/or other users or consumers of the content. Generally, the multimedia content that is perceived by the user must be long enough to allow the user to form an opinion about the content and provide a feedback that is captured through the second device. The second device is configured to allow the input to be associated with corresponding segments of the content with a particular (and, e.g., adjustable) temporal granularity.

The second device can detect multimedia content timeline through various synchronization (sync) channels. In one example, the first device accesses the content over a wireless local area network and the second device monitors the wireless link and extracts time codes that indicate content timeline. For example, time codes can be multiplexed with multimedia content data in order to facilitate proper timing of audio and visual components during playback of the content. In one example, SMPTE timecodes are used.

In another example embodiment, the content is played from a media player, where the storage format of the content includes specially designed codes that facilitate access to the media timing information. For example, the content is a Blu-ray content that conforms to the Blu-ray disc-Java (BD-J) specification. The BD-J specification allows special codes for synchronization of the content to specific frames in the content. For instance, there are two types of video synchronizations allowed, one called "loose synchronization," which uses a call back method and is accurate to within several frames of the event, and the other being "tight synchronization," which allows applications to synchronize accurately to the exact frame using time codes. The BD-J format allows communication of the content to the second device over, for example, a Wi-Fi network to provide content timeline information. The BD-J code can monitor time code data multiplexed with content data and communicate it to the second device on the Wi-Fi channel established for this purpose. Besides the time codes, additional data may be communicated, such as content identification (content ID), as well as user input through remote control devices.

In another example embodiment, the second device is equipped with a microphone that is configured to receive an audio portion of the content that propagates through air before reaching the microphone input. In one variation, the audio signal may be coupled from the first device to the second device using a wired audio connector that is, for example, connected from an "audio-out" port of the first device to an "audio-in" port of the second device. The second device can then analyze the received audio to extract particular innate characteristics of audio signal. This operation is referred to as computing a fingerprint of the audio content and it usually includes analyzing the content on a segment-by-segment basis to obtain a computed fingerprint for each content segment. This operation is typically carried out once to populate a fingerprint database that also includes additional content information, such as content identification information, ownership information, copyright information, and the like. When a plurality of audio segments are received at the second device, fingerprints are computed for the received audio segments and compared against the fingerprints that reside at the fingerprint database to obtain content timeline information. For instance, the location of each received content segment within the lager content can be determined.

Additionally, or alternatively, if the received audio segments at the second device include embedded watermarks that provide timeline information, such watermarks can be extracted by the second device to obtain the needed timeline information. Such watermarks, which are substantially imperceptibly embedded into the audio content, can further include identification information to identify the content. Alternatively, or additionally, watermarks that are embedded in the video portion of the content that is received and captured by the second device can be used for extraction of timing information.

The second device may determine the timing and synchronization information from one or more of the above described techniques and can, therefore, have one or more sync channels at its disposal. In some exemplary embodiment, if more than one sync channels is available, the second device selects a particular sync channel based on a predefined ranking, a reliability measure associated with the sync channels, instructions from the user and/or a combination thereof. In some embodiments, even after the timing and synchronization information is obtained, the second device can continue searching for timing information using one or more sync channels in order to detect when the content playback is paused or changed, such as when next/previous chapter, fast-forward/rewind operations are carried out, or the when a new content is presented (e.g., when the user switches to a different TV channel). If no sync data is obtained for an extended period of time, the second device can inform the user and/or the database that synchronization is lost.

In addition to obtaining synchronization information corresponding to the content timeline, it is desirable for the second device to identify the content. Content identification allows different contents to be distinguished from one another. In some embodiments, at least one of the sync channels is used to explicitly carry content ID information in addition to the synchronization information. For example, as noted above, embedded watermarks can carry both content ID data and timing information.

In some embodiments, content ID information is implicitly included in the synchronization data. For example, during live broadcasts of a multimedia content, the timing information can be the timeline that continuously progresses as the content is being presented. Such a timeline can continue across the boundary of distinct contents, such as a series of advertisements that are interspersed among segments of the live content. Subsequently, individual content segments of the presented content can be linked to a particular time interval and identified based on the time code by accessing a database, such as a TV guide and/or an advertiser's or broadcaster's schedule.

In some applications, manual identification of the content based on, for example, audio and/or visual inspection of the content, can be carried out. However, in some applications, it is more advantageous to automatically identify the content. In one example embodiment, content identification is carried out automatically based on matching the computed content features to predefined templates (in cases where fingerprinting techniques are used) and/or obtaining content identification through content ID data of extracted watermarks (in cases where embedded watermarks carry content ID information). Since watermarking provides a low-capacity data communication channel, it is rare that the embedded watermarks have the capacity to carry actual name or owner of the content. Instead, these watermarks often include a serial number (i.e., a number in the range 0 to $(2^n-1)$, where n is the number of bits carried in the content ID portion of the watermark payload) that can be used to uniquely identify a content by, for example, accessing a database that maps the serial number to a particular content. Alternatively, or additionally, in some embodiments, the content may be identified using the parameters that were used for embedding those watermarks. In particular, each watermark opportunity within a content can be identified using a number of parameters, such as frequency band of embedding, watermark embedding algorithm, noise-like carrier sequence used for embedding, watermark bit rate, etc. These parameters are collectively called the 'embedding stego key." Each content can be embedded using a particular embedding stego key. Once such a content is received and examined to extract the embedded watermarks, the embedding stego key can be recognized and used to identify the content.

In some example embodiments, it is advantageous to identify a target content before the playback is commenced. In these applications, the content may be initially identified using a file header, a schedule (e.g., a TV guide), and the like.

The second device further provides evaluation tools to the user. The evaluation or feedback is any input that reveals user's opinion or comments about the content at a particular moment. The evaluation tools use one or more input technologies available on the device, including, but not limited to, a touch screen, an audio input (e.g., voice command), a video input, inertial sensing, physiological (e.g., biometric) sensing, an input from a gyroscope and/or accelerometer, and others. The user interface provides an easy-to-use mechanism for entering a response or providing a feedback. For example, a positive response to the content can be provided by an upward motion, a plus sign, touching a green field on a user interface or a thumb up sign, and the like. A negative response can be represented by a sideway motion, a minus sign, touching a red field or a thumbs down sign, and the like. The user interface of the disclosed embodiments further allows the user to provide a response without distracting the user from his/her primary activity of viewing the content, even if the feedback is entered multiple times over the course of the content or over the user viewing session. For example, a user may communicate his/her opinion conveniently using a touch screen, where tapping on the touch screen or swiping up and down indicates approval, while swiping left and right indicates disapproval. Repeated tapping or swiping may indicate strong approval/disapproval. Similarly the user may provide the input in a similar fashion using a mouse, or use the up/down/left/right keys on a keyboard, etc., to convey his/her opinion based on the tools available to the second device. User input may comprise involuntary reactions such as heart rate, sweating, breathing rate, or pupillary response. Note that all of these inputs can be executed without diverting the user's gaze from the screen on which the content is displayed.

In some embodiments, alternatively, or additionally, the user interface comprises a motion sensor that is configured to detect the user's motions, which are indicative of the user's opinion regarding the content segment(s) that are being perceived at that moment. Different types of motions may be detected to signify positive or negative user opinion. For example, an up-and-down motion may signify a positive opinion, and a sideways motion may signify a negative opinion. Such motions can be detected using a motion detection device that operates based on, for example, changes in a received electromagnetic radiation (e.g., motion sensors based on infrared technologies), based on detection of rotation of a device (e.g., gyro-based techniques) and/or based on detection of changes in acceleration (e.g., accelerometer-based techniques). The motion sensors can be included as part of the second device, which enables the user to provide evaluation feedback by moving the second device, or can be incorporated into separate devices (e.g., a handheld device) that are in communication with the second device. Alternate versions of the evaluation tools may include multiple choice keys or sliders that communicate quasi-continuous values indicative of approval/disapproval, like/dislike, good/bad, correct/wrong, etc., scales. Depending on the extent of feedback and the form of user interface, in some instances, only a brief interruption in content viewing may be needed to execute content evaluation.

In some embodiments, the input received from the second device's sensors are additionally, or alternatively, processed to extract a response from user's utterings, actions, or gestures. In this context, the user interface can include, or be communicatively connected to, one or more input devices and/or sensors. In one example, the device's microphone receives an audio signal that corresponds to an uttering by the user. The received audio signal is then processed to recognize utterances of approval and disapproval, or specific noises such as applause or shouts of "boo" from an unhappy audience. Even if the user reaction cannot be clearly categorized into positive and negative type, the presence or absence of a reaction can be interpreted as significant or insignificant for the corresponding content segment. In other example embodiments, user's gestures, body motions, postures, facial impressions, and the like, can be captured using a video camera that is in communication with, or is part of, the second device. The captured video signal (and/or still images) can then be analyzed to discern user's feedback associated with particular segments of the presented content.

When a user communicates his/her evaluation of the content (e.g., his/her opinion or reaction) to the second device, this evaluation together with the timing of the evaluation with respect to the content timeline (e.g., a content time stamp) is communicated to a database using one or more of data communication channels. In one example, the database is associated with an Internet site known to the second device, and the communication is executed by connecting the second device to the Internet and transmitting the user's feedback and the associated content timing information to the database. The database receives and stores content evaluation input from multiple users. The database may also filter user inputs prior to the storage. For example, user input received while detected content playback duration is shorter than a predefined time interval may be considered an invalid input and filtered out. Alternatively, the number of inputs from the same source may be limited. One of the objectives of this filtering is to detect and prevent user's attempt to skew or corrupt the evaluation statistics.

Communications from the second device to the database may include additional information beyond user's opinion and content timing information. In one example embodiment, the second device's IP address is communicated to the database. This IP address may be used to link different user opinions over the course of one or more viewing sessions in order to analyze user's preferences. Alternatively, or additionally, a user may choose to communicate his/her identity to the database so that user preferences can be known even if the user decides to use a different device or IP address for providing feedback. Additionally, content identification information may be communicated to the database. As noted earlier, content ID can be established by the second device through the sync channel(s), through the use of watermarks or fingerprints, through manual provision of the content identification (e.g., content name) and/or other techniques. As also noted earlier, content ID may be implicitly established through the use of content time stamps.

Additionally, the information provided to the database can include information indicative of the duration of the content viewing prior to the evaluation entry as established by the sync channel. This information may be used to qualify the evaluation entries, and, for example, to allow only those that are associated with viewing durations that exceed a predetermined threshold. In some embodiments, additionally, or alternatively, the received evaluations can be scaled based on the duration of viewing such that, for example, evaluations that correspond to longer viewing durations are given a larger weight or scaling factor than the ones that correspond to shorter viewing durations. These operations that are carried out for qualifying the received evaluations can reduce or eliminate the chances of intentional manipulation of the evaluation statistics.

In some embodiments, the second device may communicate the content ID and timing information to the database whenever synchronization is established and lost, even in the absence of user evaluation input. This information can be used to qualify (e.g., accept or discard) user evaluation entries, and/or to measure audience participation or viewing habits (e.g., for audience measurement purposes). Also the information associated with the establishment and loss of synchronization can be construed as one type of user feedback. For example, a loss of synchronization and subsequent synchronization to a later segment of the same content can be associated with a fast-forward (or rewind) operation, indicative of user's disapproval (or interest, in case of rewind) of certain segments of the content but still an overall interest in that content. In contrast, a loss of synchronization and subsequent synchronization to a another content can be associated with a change of channel operation, indicative of user's disapproval of the content.

Furthermore, the second device may communicate to the database certain details regarding sync channel(s) used to obtain content timing information. These details may be useful to establish reliability and precision of the timing information. In one example embodiment, if reliability and precision of timing information is deemed low, it is discarded in favor of extrapolating previous timing information with high precision and reliability. In another embodiment, if all timing information from given user has low precision and reliability, the filtering rules are relaxed, and user input is accepted although it was not associated with playback duration of sufficient length.

Furthermore, these details about the sync channel(s) may be used to establish content ID. For example, digital watermarks obtained from an audio portion of the content, as well as parameters used in embedding those watermarks (i.e., the embedding stego key) can be used to identify the content.

In some embodiments, the user may provide additional input such as personal comments, responses to comments by another user, hyperlinks to interesting and relevant information, and the like. In one exemplary embodiment, content timeline is illustrated on the screen of the second device with salient points highlighted, so that the user can associate comments with the content timeline. The presentation of additional input data can occur in continuity with content evaluation session, or independently after the content is consumed, providing that the user consumption of the content and participation in the evaluation process can be authenticated based on IP address of the device, user ID and/or password entry, or other techniques.

In response to user evaluation entry to the database, the database provides an evaluation response. In some embodiments, such a response provides positive incentives (e.g., rewards) to the users to encourage their participation. In one example, a response is provided to the first input provided in each viewing session (e.g., in each viewing of a particular content), while additional responses to subsequent user inputs may or may not be provided.

One exemplary type of evaluation response comprises an aggregated information or statistical summary of content evaluations provided by a plurality of users as a function of timeline. In case of live broadcasts, the aggregated information or statistical summary may correspond to segments of the content that has been already presented, while in case of pre-recorded content, the aggregated information or statistical summary may correspond to content segments that have already been presented as well as yet-to-be presented content segments. An objective of such a response is to present the user with a rating or value of the content as a function of time as perceived by other users, and to allow the user to make informed decision as to whether or not continue viewing the content, whether or not to rewind or pay closer attention to segments that the user might have missed, whether or not to skip to some future salient points, etc.

Figure 3:
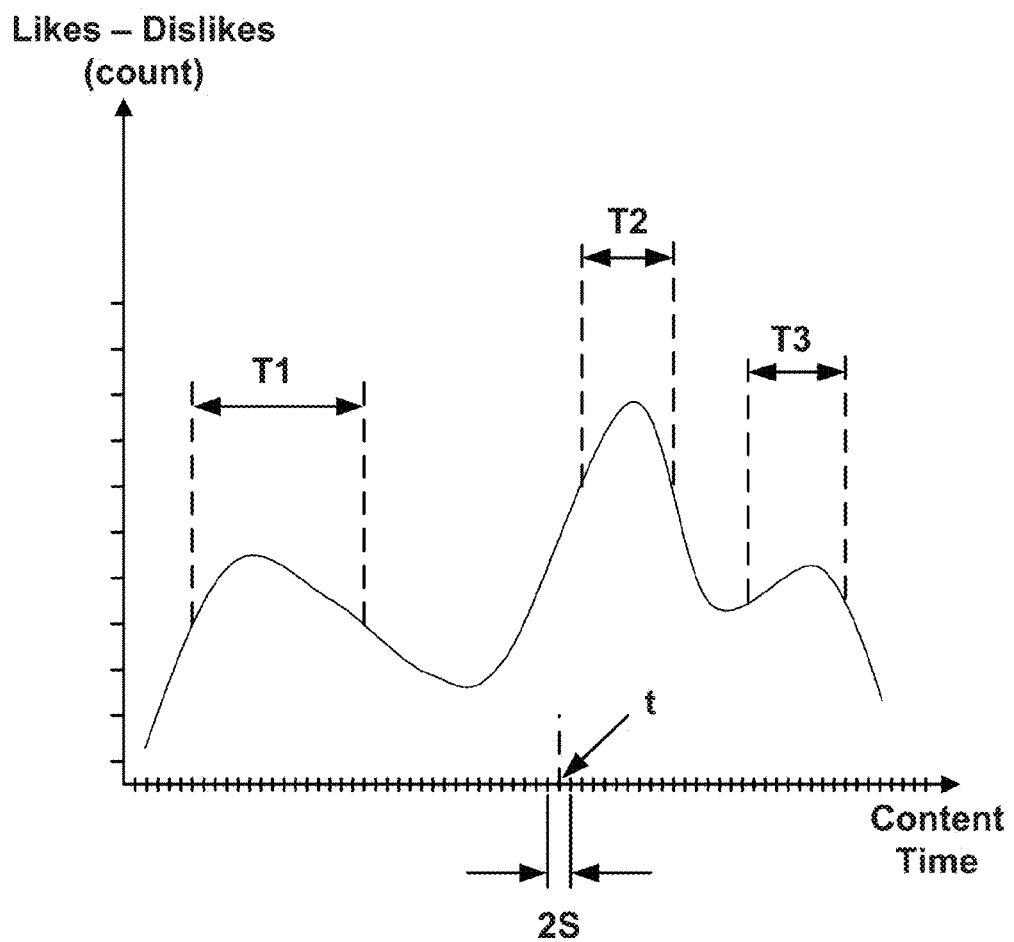
FIG. 3 illustrates an exemplary response provided on a user device in accordance with an exemplary embodiment.

The aggregated information or statistical summaries can be presented as a graph where the x-axis represents the timeline of the content and the y-axis is the count of user entries of a particular type (e.g., "likes") received in each time interval [t−s, t+s], where t is a value on the timeline and s is a predefined small value, such as one second. FIG. 3 illustrates a plot of evaluation feedback computed as the number of likes minus the number of dislikes versus content timeline in accordance with an exemplary embodiment. FIG. 3 illustrates sharp peaks during three time periods, T1, T2 and T3. The peaks illustrate that other viewers have found these sections particularly interesting. FIG. 3 only provides a simple plot to facilitate understanding of the underlying concepts. It is, however, understood that other types of plots or data can be presented to the user in accordance with the disclosed embodiments. For example, the presented data can be normalized to fall within a particular scale (e.g., 0 to 10), can include standard deviations and confidence markers, can be color-coded to present easily discernible salient points (e.g., interesting versus boring content segments), and the like. In some examples, the content timeline is divided into a sequence of intervals of duration T, e.g. T=1 s, and the y-axis corresponds to the count of user entries of particular type during each of the intervals. Different entry types may be presented simultaneously on the same graph or on distinct graphs. In some examples, user entries are represented by numbers, e.g. "like" is "+1" and "dislike" is "−1" and the y-axis can represent the sum of user inputs within the time interval specified above. The presentation of statistics can be further enhanced if the user has sliders or other tools to express an intensity of the opinion, thus enabling the presentation of content evaluation with better granularity and dynamic range (on the y-axis).

In the case of prerecorded content, the aggregated information or statistical summaries can be carried from one release phase of the content into another release phase. For example, a particular movie may be first released as a video-on-demand (VOD) content. During the VOD release phase, user opinion statistics are collected and subsequently presented to viewers when the content is released on regular cable or network television broadcasts. Similarly, statistics collected during the time when the content is released on DVD/Blu-ray discs can be used to present information to users during broadcast TV of the same content.

In some embodiments, a participating user may be presented with basic evaluation information as soon as he/she enters the first evaluation input. Alternatively, for prerecorded content, evaluation information can be viewable prior to the user's viewing, to assist the user in content selection, or after viewing the content for research, review, and the opportunity to add and modify evaluations, add comments, respond to other user's comments, etc.

In one exemplary embodiment, the collected information during viewing of the content by a first user is used to allow an abbreviated viewing of the content by a second user. For example, the first user may watch a live baseball game using a viewing system equipped with a digital video recorder (DVR). The first user provides his or her feedback for particular segments of the game as the game is being televised and recorded by the DVR. The feedback is then provided to a second user (e.g., another member of the same household), who intends to view the recorded game at a later time. The second user can utilize the feedback from the first user to watch only certain segments of the recorded baseball game that were considered interesting by the first user (e.g., a "highlights-only" content) rather than viewing the entire game. The feedback provided to the second user can be obtained from a plurality of users, such as friends of the second user, users having a common interest in baseball, baseball experts, and the like. Similar operations can be carried out to provide parental control, where, for example, a parent input can be used to allow subsequent viewing of a redacted version of the content by children in the same household.

The evaluation information may be comprehensive; that is, the aggregated information or statistical summaries can be compiled using all available user input. Alternatively, the evaluation information may be created using a subset of user feedbacks. For example, the participating user may decide to view only statistics of opinions provided his friends from a social media site. Alternatively, the user may choose to view statistics of opinions collected from users within a particular region, from a user-declared gender group and/or age group, from users with specific preferences, or based on user profile features derived from past evaluations. In some embodiments, more comprehensive and/or selective evaluation information are offered if the user meets additional criteria. For example, more comprehensive evaluation information is made available only if the user has viewed at least a significant portion of the content and/or after the user has provided additional information to the user profile.

Beyond evaluation information, the responses provided to the users may include additional informative and/or entertaining content. For example, background information about the characters or the displayed scenes can be presented to the user on the second device. This additional information is associated with the current content that is being presented by the first content, and is enabled through one or more content sync channels that were described earlier. Moreover, accessing this information doesn't require a significant effort by the user.

In order to facilitate access and presentation of information linked to specific content segments, the database includes an association between the content timeline and the content metadata related to a particular moment or immediately preceding the particular moment within the content. The metadata may include names of the actors, location of events, music score title, names of significant animals or objects, etc., associated with the content timeline. In one embodiment related to pre-recorded content, content segments are subjectively evaluated through audiovisual inspection and manual database population with relevant data. In another embodiment, automatic tools are deployed to recognize faces and/or objects within the content and to link the recognized faces and/or objects to the content timeline. The use of automatic tools are particularly advantageous when the content is present as a live broadcast since subjective association tools may introduce unwanted delays.

Time-varying evaluation of the content provides valuable information for content creators, owners, distributors or advertisers, as well, since this information can be used to improve future content design, to edit content for the next release window, to identify compelling segments for marketing and promotional purposes, to judge contributions of different participants in the content creation process, to cite favorable evaluations in advertising campaigns, and other uses. These benefits incentivizes the content creators, owners, distributors or advertisers to facilitate the collection of user feedback by, for example, embedding watermarks with timing information into audio components of their content, or to offer additional rewards to participating users.

Beyond the above-described informative data that is presented to the users, the responses provided to the users may include other, more direct rewards and incentives, such as allowing user to view additional content, providing prizes that are tailored to user preferences expressed through evaluation process, participating in a lottery for more expensive prizes, providing point awards that are accumulated over multiple viewing sessions, and the like. Those incentives may be conditioned upon complete (or partial) viewing of the content and providing the needed feedback, as, for example, established through sync channel monitoring, or can be conditioned upon user's adherence to a proper evaluation protocol. Moreover, special rewards can be offered to users that participate in content evaluation early, and provide good prediction of user responses over longer period of times. Those users may be offered access to new content prior to general release in order to create initial time varying evaluation of audiovisual content (e.g., prior to the general release).

In addition to rewards and incentives provided to the user, the database may provide monetizing responses to the user, as well. Such a monetizing responses, for example, enables the content provider, the broadcaster, a third party, etc., to present purchasing opportunities to the user. In one example embodiment, based on the user input, the database provides recommendations for purchase of additional content that match the user's preferences. Additionally, evaluation responses may contain purchase offers that are related to content moments that are currently being presented on the first device, as established through the one or more sync channels. For example, if the presented content segment includes certain brand or type of clothing, the user is presented with an opportunity to purchase the same brand/type of clothing using the second device. To minimize user's distraction and to promote such monetary transactions, monetizing responses can be carefully designed and balanced with a variety of rewards and incentives.

In some embodiments, in addition to providing evaluation responses to the users and/or content creators, content owners and advertisers, the database can be used for data-mining purposes. For example, the information at the database can be used to compare the overall popularity or level of user interest in different contents, as well as in different actor performances. Data-mining can be used to correlate user preferences across different contents in order to better understand user behavior and wishes. For example, in case of a live broadcast of a political debate, the database can provide information about performance of individual politicians as a function of time, in real time. In such scenarios, by utilizing the timing information that is obtained through the sync channels (i.e., timing information that is based on content timeline rather than an absolute time measurement), variations in propagation delays, buffering delays prior to retransmission (e.g. in IPTV), delays due to transcoding operations, different delays associated with censorship, etc., across multiple distribution channels are mitigated. Furthermore, the timing information and the associated feedback obtained from the user can be collected during delayed viewings of a content. As such, the use of timing information in accordance with the disclosed embodiments enables collection of feedback from a larger group of users, and is effected with enhanced reliability and accuracy.

Since user evaluations received at the database can affect other users' decisions as to how to consume the content, or the decisions of content owners, distributors and/or advertisers on how to treat the content, it is important to ensure the integrity of the content evaluation process. In some embodiments, the application that provides user feedback on the second device is tamper resistant and includes authentication procedures when communicating with the database. Further, communications with the database can be encrypted to prevent interception and manipulation of the messages to/from the database. The sync channels are also designed to be robust to manipulation and forgery by, for example, using a proprietary watermarking technology to embed time codes, or information that can be used for synchronization purposes.

Figure 4:
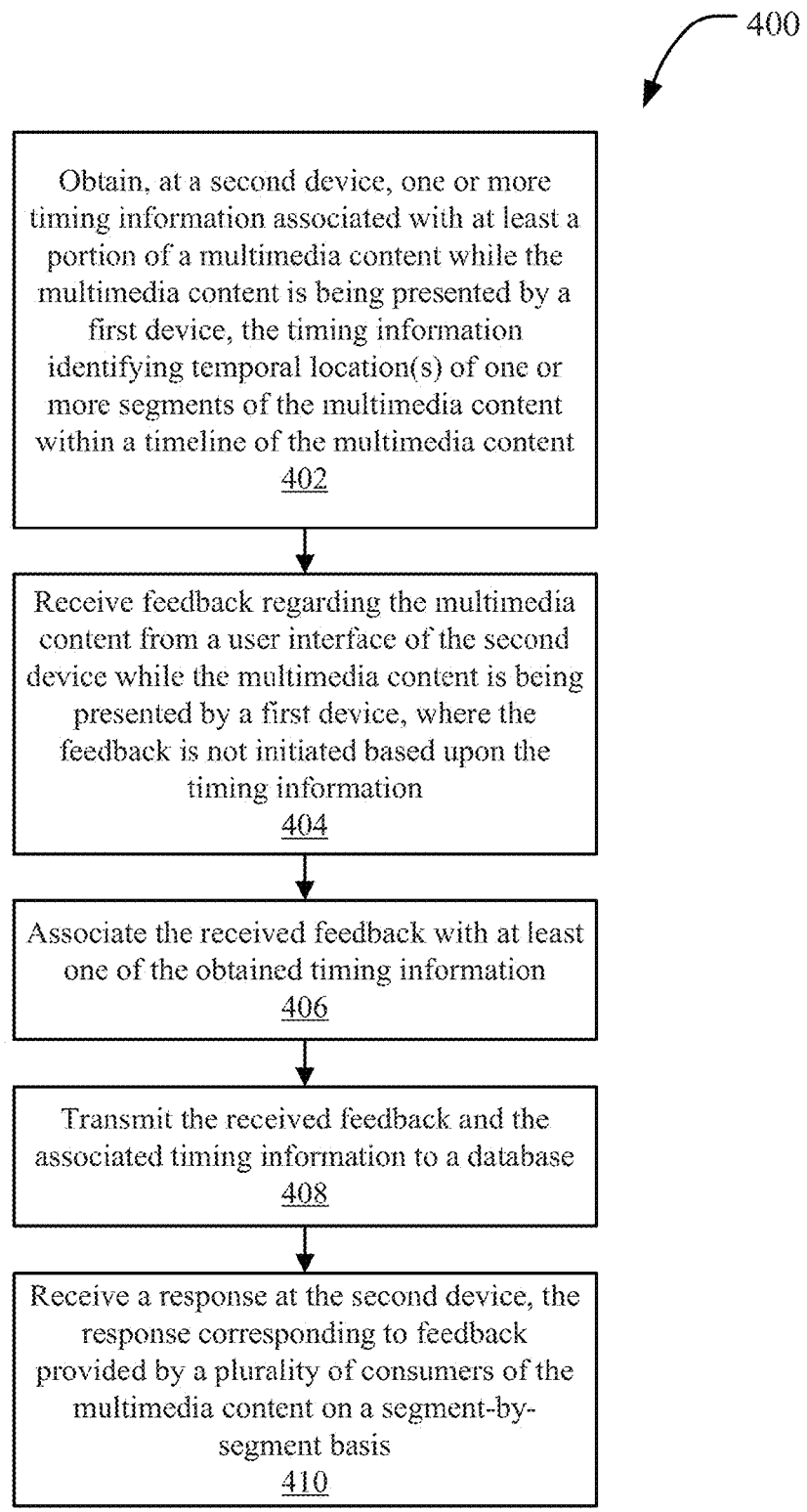
FIG. 4 illustrates a set of operations that may be carried out in accordance with an exemplary embodiment.

FIG. 4 illustrates a set of operations 400 that can be carried out in accordance with an exemplary embodiment. The exemplary operations 400 can be carried out at, for example, one of the secondary devices that are illustrated in FIG. 1. At 402, one or more timing information associated with at least a portion of a multimedia content is obtained at a second device while the multimedia content is being presented by a first device. One or more portions can span one or more segments of the multimedia content and can include, but is not limited to, one or more of an acoustically propagated audio portion, an optically propagated video/image portion, a portion of the multimedia content that is in a suitable format for wireless transmission, etc. The timing information identifies temporal location(s) of one or more segments of the multimedia content within a timeline of the multimedia content. At 404, feedback regarding the multimedia content from a user interface of the second device is received while the multimedia content is being presented by a first device. A user or consumer of the multimedia content can provide a feedback at any time (e.g., spontaneously) during the presentation of the content without having to wait for specific time frames, or having to be prompted for input. As such, the feedback is not initiated or triggered based on the timing information that is obtained at 402. These features of the disclosed embodiments, enable the use of user feedback tools such as touch screen fields (or screen touch interpreters), motion sensor interpreters, physiological sensors, speech recognition tools, etc., that are not content specific (i.e. they aren't varying from content to content or from one portion of content to another). This property of feedback tools is essential to achieve simple, non-distracting collection of time-varying evaluation of audiovisual content from general public.

At 406, the received feedback is associated with at least one of the obtained timing information. For example, the timing information can be a time stamp that identifies the temporal position of a particular segment of the multimedia content. The association of the time stamp and the feedback thus correlates or links the received feedback to that particular time stamp (or content segment). At 408, the received feedback and the associated timing information is transmitted to a database, such as database 114 that is depicted in FIG. 1. At 410, a response from the database is received at the second device. The response may comprise time-varying evaluation of the content that corresponds to feedback provided by a plurality of consumers of the multimedia content on a segment-by-segment basis. Such time-varying information can, for example, be displayed in the form of a graphical representation on the display at a device, such as the second device. As such, a user of the multimedia content can have ready access to evaluations of the content on a segment-by-segment basis.

It should be noted that after the completion of step 408, the response, such as time varying evaluation of the content, is transmitted by the database (e.g., by the processing and transmission components therein) to a device, such as the second device.

Figure 5:
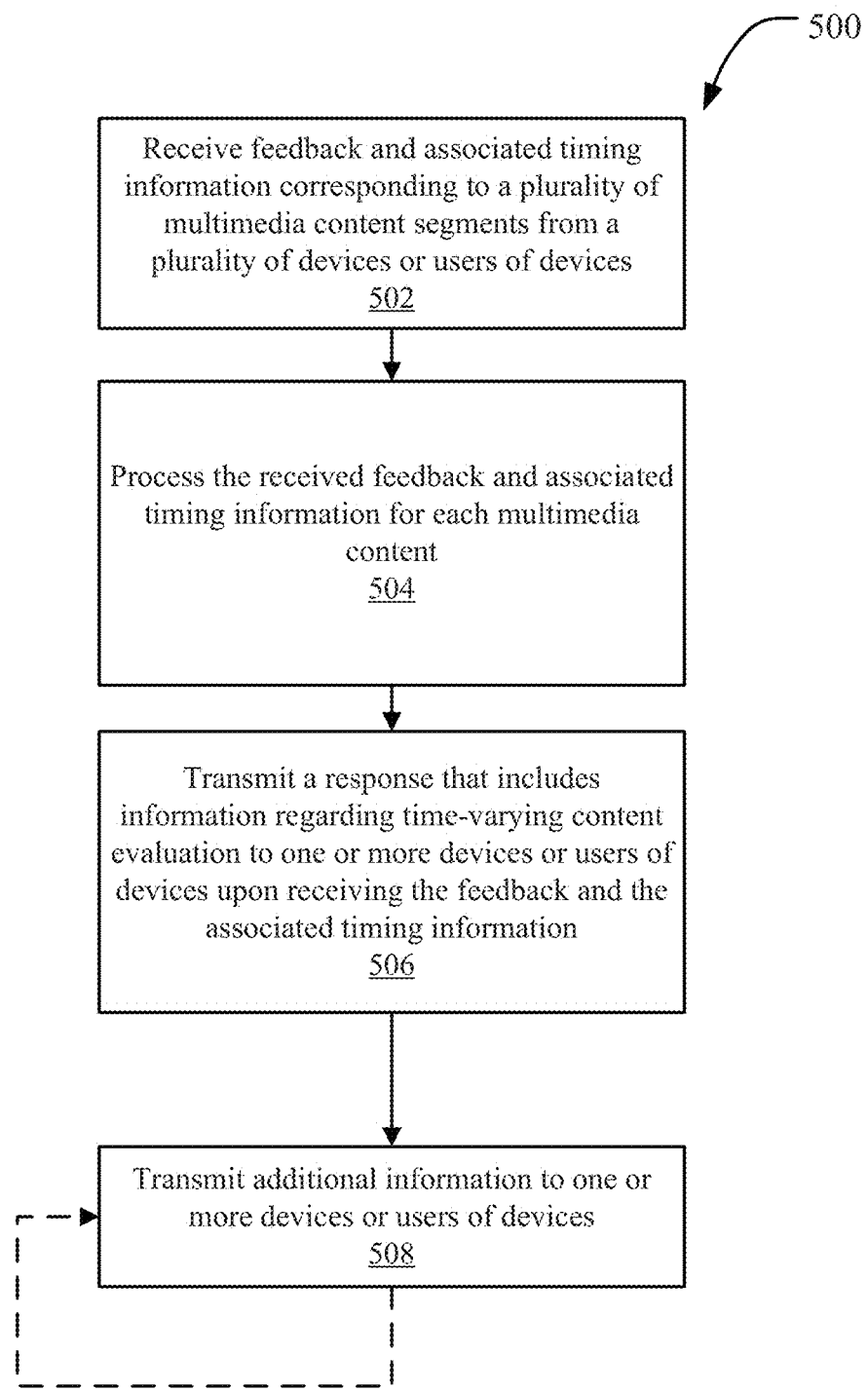
FIG. 5 illustrates a set of exemplary operations that can be carried out for providing data about time-varying content evaluation in accordance with an exemplary embodiment.

FIG. 5 illustrates a set of exemplary operations 500 that can be carried out for providing the data about time-varying content evaluation in accordance with an exemplary embodiment. The operations 500 can be carried out at, for example, the database 114 that is illustrated in FIG. 1. At 502, feedback and the associated timing information corresponding to a plurality of multimedia content segments are received from a plurality of devices and/or users of devices. The received information can correspond to the same content (e.g., a broadcast TV program) that is being viewed by a plurality of users or to different multimedia content that is being viewed by a plurality of users. At 504, the received feedback and the associated timing information is processed for each multimedia content. Such processing can, for example, include, identifying the content, determining whether the received feedback meets certain qualifications, analyzing synchronization successes and failures received from a particular user for a particular content, combining evaluation feedback received from multiple users for each segment of the content, producing aggregated results and statistical summaries, and the like. At 506, a response that includes information regarding time-varying content evaluation is transmitted to one or more devices or users of devices. Such information relates to an assessment of the multimedia content on a content segment-by-segment basis and can include statistical information about the content or content segments. The response at 506 is transmitted upon receiving the feedback and the associated timing information (e.g., after the operations at 504 are completed).

At 508, additional information may be transmitted to the one or more devices or users of the devices. This additional information can include information about characters that appear in the multimedia content, scenes that are presented in the content, rewards or incentives to the user, opportunities for the users to purchase items, and the like. In some example embodiments, the transmission of the response at 506 only occurs once for each particular content after receiving a first feedback from a device or user of the device. In other example embodiments, additional feedback and timing information is received, and subsequent responses at 506, or additional information at 508, can be provided to the device or the user of the device. As indicated by dashed arrow that leaves and re-enters the box with reference numeral 508, multiple additional information items can be transmitted after a single or multiple feedbacks.

It is understood that the various embodiments of the present disclosure may be implemented individually, or collectively, in devices comprised of various hardware and/or software modules, units and components. In describing the disclosed embodiments, sometimes separate components have been illustrated as being configured to carry out one or more operations. It is understood, however, that two or more of such components can be combined together and/or each component may comprise sub-components that are not depicted. Further, the operations that are described in the present application are presented in a particular sequential order in order to facilitate understanding of the underlying concepts. It is understood, however, that such operations may be conducted in a different sequential order, and further, additional or fewer steps may be used to carry out the various disclosed operations.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

A content that is embedded with watermarks in accordance with the disclosed embodiments may be stored on a storage medium or transmitted through a communication channel. In some embodiments, such a content that includes one or more imperceptibly embedded watermarks, when accessed by a content handling device (e.g., a software or hardware media player) that is equipped with a watermark extractor and/or a fingerprint computation component, can trigger a watermark extraction or fingerprint computation process to trigger the various operations that are described in this application.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   obtaining, at a second device, one or more timing information associated with at least a portion of a multimedia content while the multimedia content is being presented by a first device, the timing information identifying temporal location(s) of one or more segments of the multimedia content within a timeline of the multimedia content and used for establishing synchronization, wherein the synchronization is established by using the timing information obtained from one of a plurality of synchronization channels selected based on a reliability ranking of the plurality of the synchronization channels;
   receiving feedback regarding the multimedia content from a user interface of the second device while the multimedia content is being presented by a first device, wherein the received feedback is not initiated based upon the timing information;
   associating the received feedback with at least one of the obtained timing information;
   transmitting the received feedback and the associated timing information to a database; and
   receiving a response, the response corresponding to feedback provided by a plurality of consumers of the multimedia content on a segment-by-segment basis, wherein:
   the transmitted feedback and the associated timing information is received at the database and processed at the database to produce at least a portion of the response, and the response is transmitted from the database to the second device.

2. The method of claim 1, wherein the timing information is obtained from time codes associated with a wireless transmission of the multimedia content.

3. The method of claim 1, wherein the timing information is obtained from time codes associated with the multimedia content as stored on an optical data storage medium.

4. The method of claim 1, wherein the timing information is obtained from watermarks embedded in the portion(s) of the multimedia content.

5. The method of claim 1, wherein the timing information is obtained by:
   computing one or more fingerprints for the portions portion(s) of the multimedia content; and
   comparing the computed fingerprints with a sequence of fingerprints stored at a fingerprint database.

6. The method of claim 1, further comprising obtaining identification information associated with the multimedia content.

7. The method of claim 6, wherein the identification information is obtained using watermarks embedded in the portion(s) of the multimedia content.

8. The method of claim 6, wherein the identification information is obtained by:
   computing one or more fingerprints for the portions portion(s) of the multimedia content; and
   comparing the computed fingerprints with a sequence of fingerprints stored at a fingerprint database.

9. The method of claim 1, wherein receiving the feedback comprises detecting a motion of at least one of: a user of the second device and the second user device.

10. The method of claim 1, wherein receiving the feedback comprises:
    obtaining a video and/or an audio signal of a user of the second device; and
    processing the video and/or the audio signal to discern the user's preferences of the multimedia content.

11. The method of claim 1, further comprising transmitting an indication of lack of received feedback for one or more segments of the multimedia content to the database.

12. The method of claim 1, further comprising transmitting one or more of the following to the database:
    an identification information associated with the second device,
    an identification information associated with a user of the second device,
    a duration of multimedia content viewing prior to receiving the feedback,
    information indicative of successful or unsuccessful acquisition of timing information for the one or more multiple segments of the multimedia content, and
    comments provided by a user of the second device.

13. The method of claim 1, wherein the received response includes one or more of the following:
    aggregated results or statistical summaries of the feedback provided by the plurality of consumers for each segment of the multimedia content;
    information corresponding to yet-to-be-presented segments of the multimedia content; and
    information corresponding to feedback provided by a subset of the plurality of consumers.

14. The method of claim 1, further comprising receiving additional information associated with the multimedia content based on the obtained timing information, the additional information comprising one or more of:
    information associated with a character appearing in a particular segment of the multimedia content that is being presented, and
    information associated with a scene in a particular segment of the multimedia content that is being presented.

15. The method of claim 1, further comprising receiving one or more of: a reward based on the obtained timing information, and an opportunity for purchasing an item based on the obtained timing information.

16. A device, comprising:
    a processor; and
    a memory comprising processor executable code, the processor executable code, when executed by the processor, configures the device to:
    obtain one or more timing information associated with the at least a portion of a multimedia content while the multimedia content is being presented by a different device, the timing information identifying temporal location(s) of one or more segments of the multimedia content within a timeline of the multimedia content and used for establishing synchronization, wherein the synchronization is established by using the timing information obtained from one of a plurality of synchronization channels selected based on a reliability ranking of the plurality of the synchronization channels;

receive feedback regarding the multimedia content from a user interface of the device while the multimedia content is being presented by the different device, wherein the received feedback is not initiated based upon the timing information;

associate the received feedback with at least one of the obtained timing information;

transmit the received feedback and the associated timing information to a database; and receive a response, the response corresponding to feedback provided by a plurality of consumers of the multimedia content on a segment-by-segment basis.

17. A computer program product, embodied on a non-transitory computer readable medium, comprising:

program code for obtaining one or more timing information associated with at least a portion of a multimedia content while the multimedia content is being presented by a first device, the timing information identifying temporal location(s) of one or more segments of the multimedia content within a timeline of the multimedia content and used for establishing synchronization, wherein the synchronization is established by using the timing information obtained from one of a plurality of synchronization channels selected based on a reliability ranking of the plurality of the synchronization channels;

program code for receiving feedback regarding the multimedia content from a user interface of a second device while the multimedia content is being presented by the first device, wherein the received feedback is not initiated based upon the timing information;

program code for associating the received feedback with at least one of the obtained timing information;

program code for transmitting the received feedback and the associated timing information to a database; and program code for receiving a response at the second device, the response corresponding to feedback provided by a plurality of consumers of the multimedia content on a segment-by-segment basis.

18. A system, comprising:

a timing information detector at a second device configured to obtain one or more timing information associated with at least a portion of a multimedia content while the multimedia content is being presented by a first device, the timing information identifying temporal location(s) of one or more segments of the multimedia content within a timeline of the multimedia content;

a user interface configured to receive user feedback regarding the multimedia content, wherein the user feedback is not initiated based upon the timing information; and a synchronization component configured to associate the received feedback with at least one of the obtained timing information and establish synchronization based on the timing information is obtained from one of a plurality of synchronization channels selected based on a reliability ranking of the plurality of the synchronization channels; and a communication unit configured to:

transmit the received feedback and the associated timing information to a database; and receive a response at the second device corresponding to feedback provided by a plurality of consumers of a multimedia content on a segment-by-segment basis.

19. The system of claim 18, wherein the timing information detector is configured to obtain one or more timing information from time codes associated with a wireless transmission of the multimedia content.

20. The system of claim 18, wherein the timing information detector is configured to obtain one or more timing information from time codes associated with the multimedia content as stored on an optical data storage medium.

21. The system of claim 18, wherein the timing information detector is configured to obtain one or more timing information from watermarks embedded in the portion(s) of the multimedia content.

22. The system of claim 18, wherein the timing information detector is configured to obtain one or more timing information by:

computing one or more fingerprints for the portions portion(s) of the multimedia content; and comparing the computed fingerprints with a sequence of fingerprints stored at a fingerprint database.

23. The system of claim 18, further comprising an identification code extractor configured to obtain identification information associated with the multimedia content.

24. The system of claim 23, wherein the identification code extractor is configured to obtain the identification information using watermarks embedded in the portion(s) of the multimedia content.

25. The system of claim 23, wherein the identification code extractor is configured to obtain the identification information is obtained by:

computing one or more fingerprints for the portions portion(s) of the multimedia content; and comparing the computed fingerprints with a sequence of fingerprints stored at a fingerprint database.

26. The system of claim 18, wherein the feedback comprises detecting a motion of at least one of: a user of the system and a component of the system.

27. The system of claim 18, wherein at least a portion of the user feedback is received as a video and/or an audio signal of a user of the system, and the system further comprises a processor configured to process the video and/or the audio signal to discern the user's preferences of the multimedia content.

28. The system of claim 18, wherein the communication unit is further configured to transmit an indication of lack of received user feedback for one or more segments of the multimedia content to the database.

29. The system of claim 18, wherein the communication unit is further configured to transmit one or more of the following to the database:

an identification information associated with the second device, an identification information associated with a user of the second device, a duration of multimedia content viewing prior to receiving the feedback, information indicative of successful or unsuccessful acquisition of timing information for the one or more multiple segments of the multimedia content, and comments provided by a user of the second device.

30. The system of claim 18, wherein the response system includes one or more of the following:

aggregated results or statistical summaries of the feedback provided by the plurality of consumers for each segment of the multimedia content;

information corresponding to yet-to-be-presented segments of the multimedia content;
includes information corresponding to feedback provided by a subset of the plurality of consumers.

31. The system of claim 18, wherein the communication unit is further configured to receive additional information associated with the multimedia content based on the obtained timing information, the additional information comprising one or more of:
information associated with a character appearing in a particular segment of the multimedia content that is being presented, and
information associated with a scene in a particular segment of the multimedia content that is being presented.

32. The system of claim 18, wherein the communication unit is further configured to receive one or more of: a reward based on the obtained timing information, and an opportunity for purchasing an item based on the obtained timing information.

33. The system of claim 18, further comprising a remote server, comprising the database, the remote sever further comprising:
a receiver configured to receive the transmitted user feedback and the associated timing information;
a processor configured to process the feedback and the associated timing information to produce at least a portion of the response; and
a transmitter configured to transmit the response from the database.

34. The system of claim 18, further including a third device that is configured to receive the response.

* * * * *

UNITED STATES PATENT AND TRADEMARK OFFICE
CERTIFICATE OF CORRECTION

PATENT NO. : 8,726,304 B2
APPLICATION NO. : 13/615320
DATED : May 13, 2014
INVENTOR(S) : Rade Petrovic et al.

Page 1 of 1

It is certified that error appears in the above-identified patent and that said Letters Patent is hereby corrected as shown below:

In the claims

In Column 19, Lines 64-65, in Claim 5, please delete "portions portion(s)" and insert -- portion(s) --, therefor.

In Column 20, Lines 9-10, in Claim 8, please delete "portions portion(s)" and insert -- portion(s) --, therefor.

In Column 22, Lines 19-20, in Claim 22, please delete "portions portion(s)" and insert -- portion(s) --, therefor.

In Column 22, Lines 33-34, in Claim 25, please delete "portions portion(s)" and insert -- portion(s) --, therefor.

Signed and Sealed this
Twenty-fourth Day of May, 2016

Michelle K. Lee
*Director of the United States Patent and Trademark Office*